US006292889B1

(12) United States Patent
Fitzgerald et al.

(10) Patent No.: US 6,292,889 B1
(45) Date of Patent: *Sep. 18, 2001

(54) DISTRIBUTED COMPUTER NETWORK INCLUDING HIERARCHICAL RESOURCE INFORMATION STRUCTURE AND RELATED METHOD OF DISTRIBUTING RESOURCES

(75) Inventors: Albion J. Fitzgerald, Ridgewood, NJ (US); Joseph J. Fitzgerald, New Paltz, NY (US)

(73) Assignee: Novadigm, Inc., Manwah, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/979,083

(22) Filed: Nov. 26, 1997

Related U.S. Application Data

(63) Continuation of application No. 08/756,730, filed on Nov. 26, 1996, now abandoned, which is a continuation of application No. 08/237,498, filed on May 2, 1994, now Pat. No. 5,581,764, which is a continuation-in-part of application No. 08/056,333, filed on Apr. 30, 1993, now abandoned.

(51) Int. Cl.[7] ................................................. G06F 11/00

(52) U.S. Cl. ..................... 713/1; 713/2; 713/3; 709/220; 709/221

(58) Field of Search .................................. 395/200.1, 651, 395/652, 653; 713/1, 2, 3; 709/220, 221, 222, 203, 218, 219

(56) References Cited

U.S. PATENT DOCUMENTS

| | | |
|---|---|---|
| 4,558,413 | 12/1985 | Schmidt et al. . |
| 4,780,821 | 10/1988 | Crossley . |
| 4,951,192 | 8/1990 | Chase, Jr. et al. . |
| 5,155,847 | 10/1992 | Kirouac et al. . |
| 5,247,683 | 9/1993 | Holmes et al. . |
| 5,263,164 | 11/1993 | Kannady et al. . |
| 5,282,273 | 1/1994 | Ushio et al. . |
| 5,325,527 * | 6/1994 | Cwikowski et al. .............. 395/200.1 |
| 5,432,941 * | 7/1995 | Crick et al. ........................... 395/651 |
| 5,473,772 | 12/1995 | Halliwell et al. . |
| 5,586,322 | 12/1996 | Beck et al. . |
| 5,619,716 * | 4/1997 | Nonaka et al. ...................... 395/800 |

FOREIGN PATENT DOCUMENTS

WO 91/02313 2/1991 (WO) .
WO 93/04426 4/1993 (WO) .

OTHER PUBLICATIONS

Bauer, Michael A., et al, Replication Strategies for X.500: Experiments with a Prototype X.500 Directory, IBM Technical Report 279, Oct. 1990.*

(List continued on next page.)

Primary Examiner—Nadeem Iqbal
Assistant Examiner—Bryce Bonzo
(74) Attorney, Agent, or Firm—Morrison & Foerster LLP

(57) ABSTRACT

In an enterprise-wide network which includes at least one centralized computer and a plurality of desktop computers, a method for enterprise system management comprising the steps of: storing an Already Have list for each desktop; storing a plurality of Should Have sub-lists; and generating a respective Should Have list from the stored sub-lists for a respective desktop computer during configuration of the desktop computer; wherein the Schema of the generated Should Have list includes at least one dynamic linkage which encompasses more than on Should Have sub-lists.

5 Claims, 28 Drawing Sheets

OTHER PUBLICATIONS

Barbara, Daniel, and Lipton, Richard J., A Class of Randomized Strategies for Low–Cost Comparison of File Copies, IEEE Transactions on Parallel and Distributed Systems, vol. 2, No. 2, Apr. 1991, pp. 160–170.*

Bauer, Michael, et al., Replication Strategies for X.500: Experiments with a Prototype X.500 Directory, Oct. 1990.*

Barbara, Daniel and Lipton, Richard J., A Class of Randomized Strategies for Low–Cost Comparison of File Copies, Apr. 1991.*

TeleView 2.1 User Guide, Telemetrix TeleView Session Layer Release 2.1 Terminal User's Guide, Copyright Telemetrix, Inc. 1986.

TeleView 2.1 Installation Guide, Telemetrix TeleView Session Layer Release 2.1 Terminal User's Guide, Copyright Telemetrix, Inc. 1986.

TeleView 2.1 Configuration Reference, Telemetrix TeleView Session Layer Release 2.1 Terminal User's Guide, Copyright Telemetrix, Inc. 1986.

TeleView Exit Guide, Telemetrix TeleView Session Layer Release 2.1 Terminal User's Guide, Copyright Telemetrix, Inc. 1986.

Teleview Release 2.1 Documentation Set Figures and Illustrations, Telemetrix TeleView Session Layer Release 2.1 Terminal User's Guide, Copyright Telemetrix, Inc. 1986.

Expert Witness Report of Le Roy Tymes, Feb. 12, 1999.

Expert Witness Report of Marshall Kirk McKusick, Ph.D., Feb. 12, 1999.

Deposition Transcript of Le Roy Tymes, Apr. 21, 1999.

Barbara, D., et al., "A Class of Randomized Strategies for Low–Cost Comparison of File Copies," IEEE Transactions on Parallel and distributed Systems, Princeton University, vol. 2, No. 2, pp. 160–170 (1991).

Bauer, M.A., et al., Replication Strategies for X.500: Experiments with a Prototype X.500 Directory, Technical Report 279, Supported by Centre for Advanced Studies of the IBM Toronto Laboratory, ISBN No. 0–7714–1243–6 (Oct. 1990).

IBM, *IBM Distributed Change Management Facility/MVS: General Information Manual*, Bank of America Corporation Version 1, Release 1 (Aug. 1990).

Katz, R.H., et al., "Version Modeling Concepts for Computer–Aided Design Databases," SIGMOD Record, ACM SIGMOD '86, International Conference on Management of Data, vol. 15, No. 2, pp. 379–386 (Jun. 1986).

Knuth, D.E., *The Art of Computer Programming*, Addison–Wesley Publishing, (1968).

LoVerso, Susan, et al., "The OSF/1 Unix Filesystem (UFS)," USENIX, Dallas Texas, pp. 207–218 (Winter 1991).

Prusker, F.J., et al., "The Siphon: Managing Distant Replicated Repositories," Proceedings of the Workshop on the Management of Replicated Data, IEEE Computer Soc. Press, pp. 44–47 (Nov. 1990).

Computer Systems Research Group, *UNIX User's Reference Manual (URM)*, 4.3 Berkeley Software Distribution Virtual VAX–11 Version, University of California, Berkeley, (Apr. 1986).

Tivoli Systems Inc., *Tivoli/Courier Management Application Guide*, Version 1.6 for SunOS, Austin, Texas, (Apr. 14, 1993).

Tivoli Systems Inc., *TME Reference Guide*, Version 1.6 for Sun OS, Austin, Texas, (Apr. 14, 1993).

P.Barthram, et al. "Distribution Management—ICL's Open approach," *ICL Technical Journal*, vol. 7,No. 4, Oxford, GB, Nov. 1991, pp. 702–716.

J.M. Bennett, et al., "An Analysis of Replication Strategies for X.500–like Distributed Directories," *IEEE*, pp. 137–142.

W. Courington, "The Network Software Environment," *Sun Microsystems*, Inc. 1989.

Tony Gale, "The Evolution within ICL of an Architecture for Systems Management," *ICL Technical Journal*, vol. 7,No. 4, Oxford, GB, Nov. 1991, pp. 673–685.

L. Brooks Hickerson, et al., "Managing Networked Workstations," *IEEE Spectrum*, Apr. 1992, pp. 55–56, 58.

J. Metzner, "A parity Structure for Large Remotely Located Replicated Data Files," *IEEE Transactions on Computers*, vol. C32, No. 5, Aug. 1983, pp. 727–730.

"Reference Monitor–Location of Resource Access," *IMB Technical Disclosure Bulletin*, vol. 32, No. 10A, Armonk, US, Mar. 1990, p. 335.

S. Shafer, et al., "The SUP Software Upgrade Protocol," Carnegie Mellon University School of Computer Science.

Carl W. Symborski, "Updating Software and Configuration Data in A Distributed Communications Network," *IEEE Spectrum*, 1988, pp. 331–338.

USENIX Association, Summer Conference Proceedings, Jun. 9–13, 1986, pp. 159–171.

USENIX Association, Proceedings of the Sixth Systems Administration Conference (LISA VI), Oct. 19–23, 1992, pp. 175–196.

International Search Report dated Jul. 13, 1994 in PCT/US94/04499.

International Search Report dated Sep. 2, 1994 in PCT/US94/04504.

International Search Report dated Sep. 2, 1994 in PCT/US94/04896.

* cited by examiner

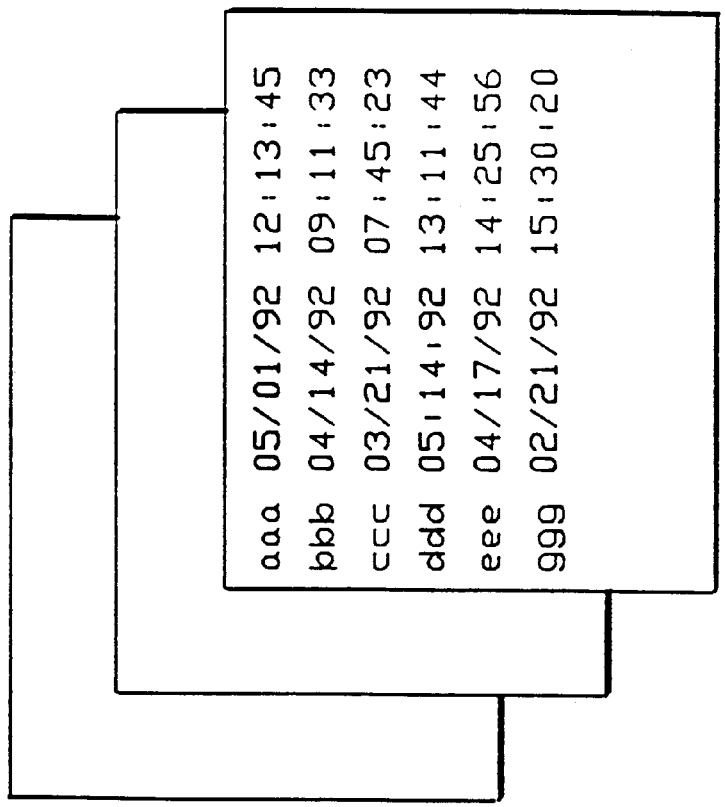
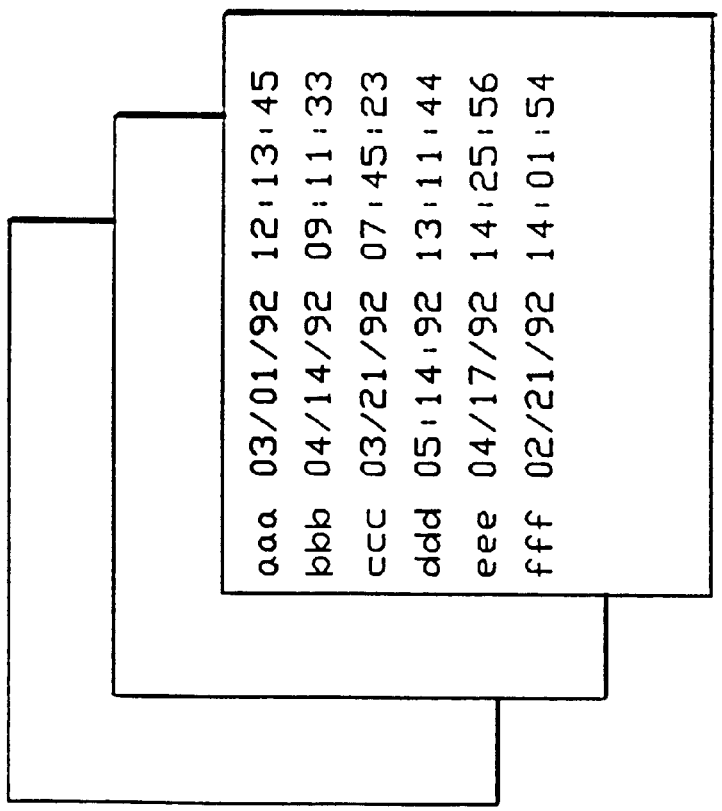
FIG. -4
(PRIOR ART)

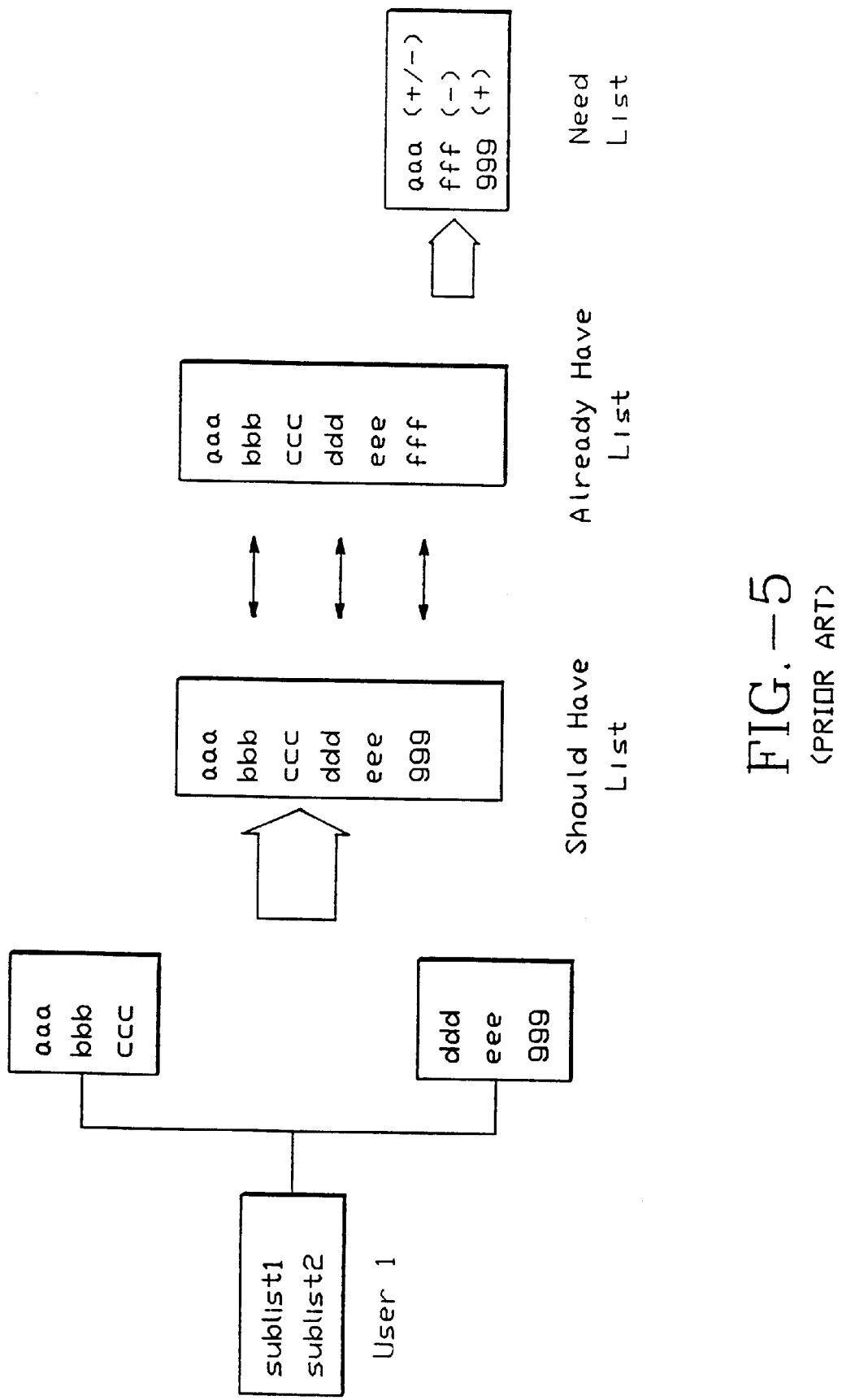
FIG. —5
(PRIOR ART)

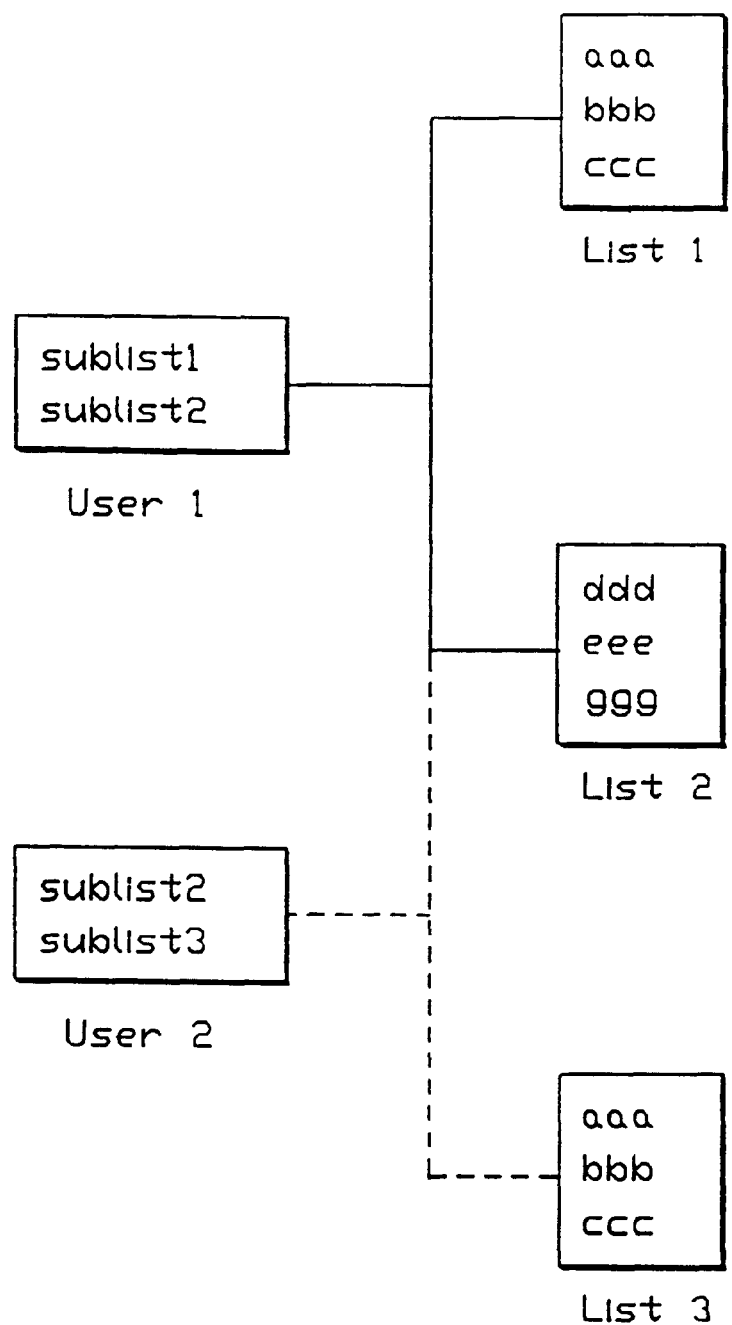
FIG.—6
(PRIOR ART)

| LSDT |
|---|
| 05/14/92 13:11:44 |

LSTD is >= any LUDT in AHL

Already Have List

| Name | LUDT |
|---|---|
| aaa | 05/01/92 12:13:45 |
| bbb | 04/14/92 09:11:33 |
| ccc | 03/21/92 07:45:23 |
| ddd | 05/14/92 13:11:44 |
| eee | 04/17/92 14:25:56 |
| ggg | 02/21/92 15:30:20 |

Should Have List

FIG. −9

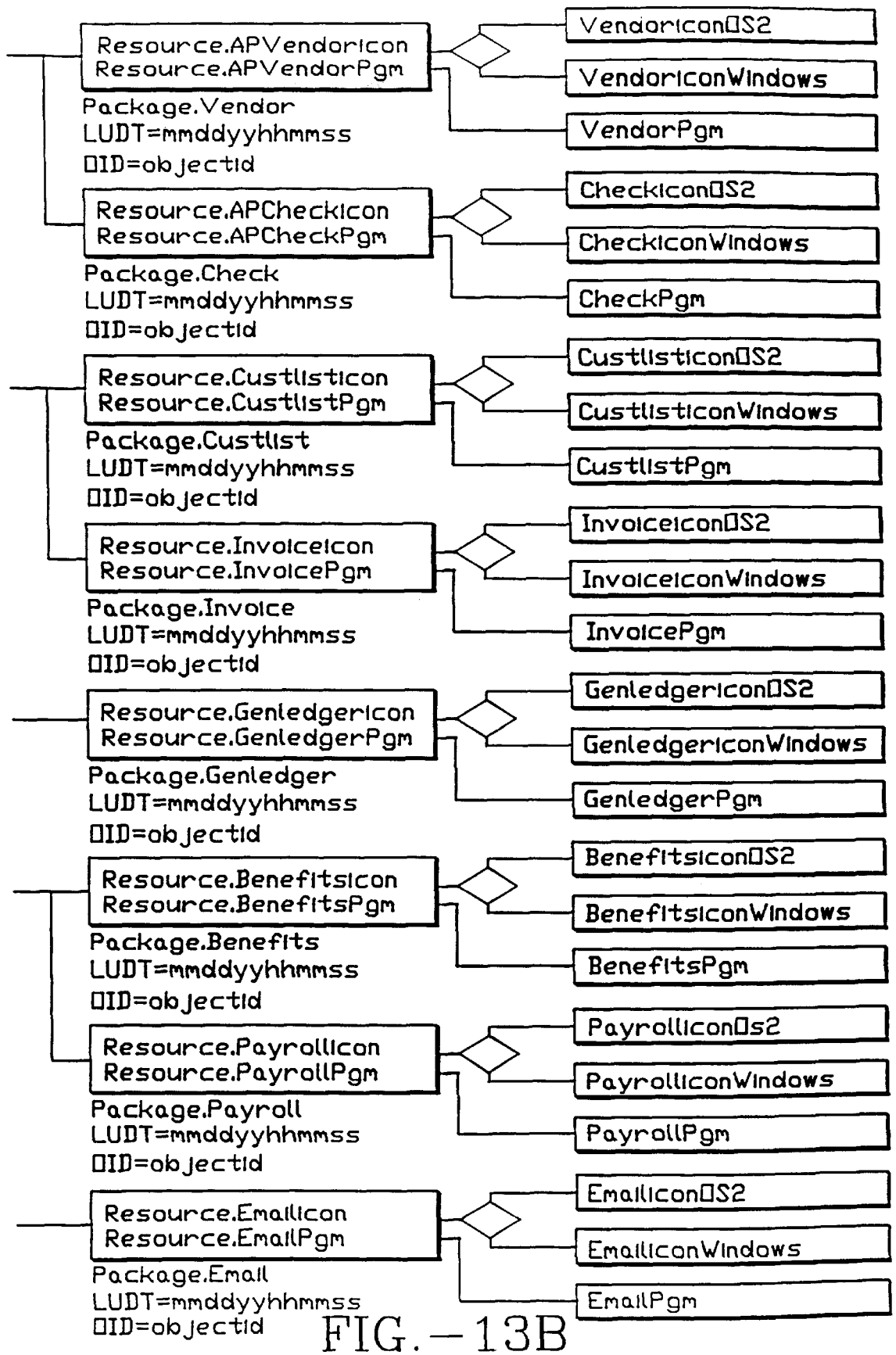
FIG.—13B

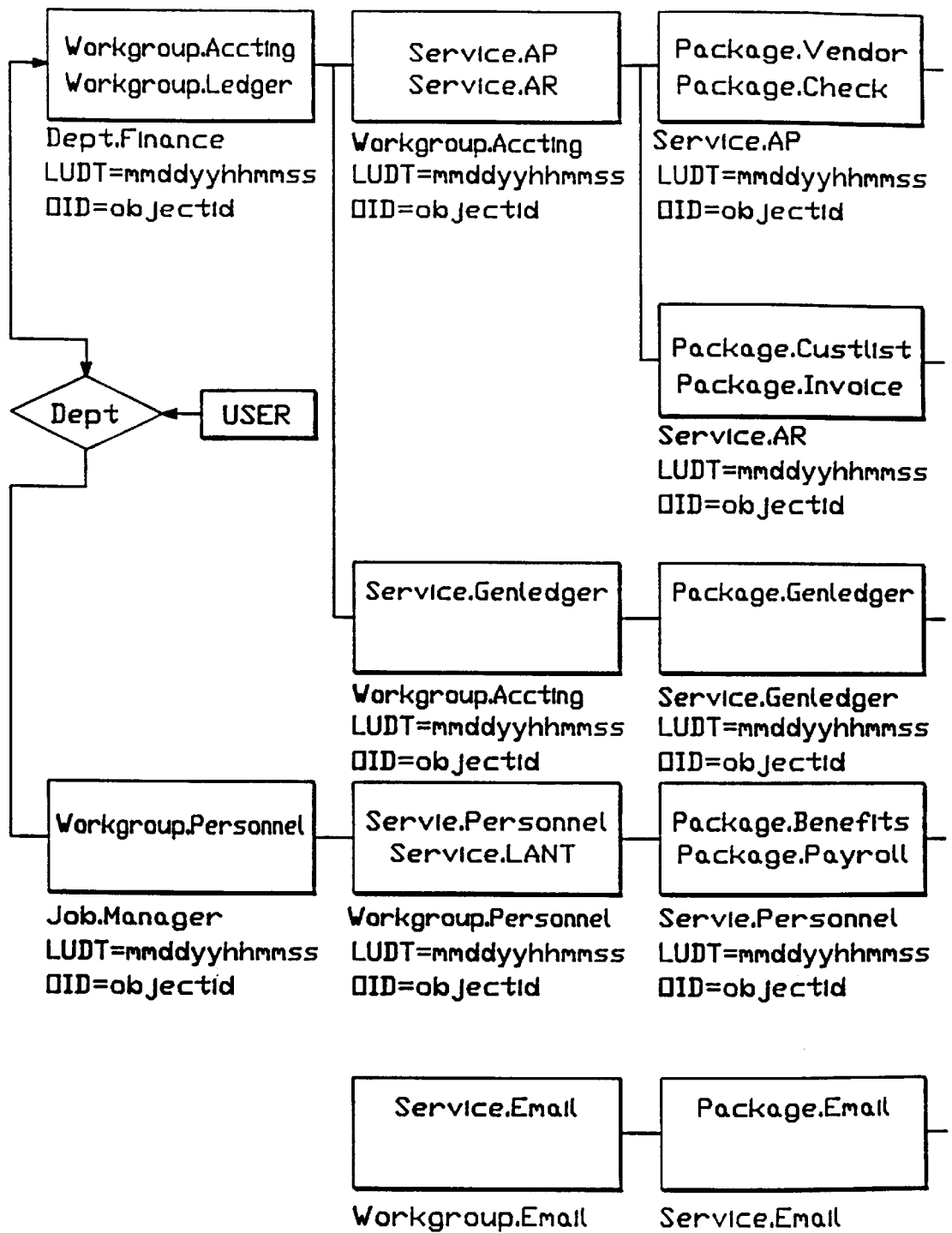
FIG.—14A

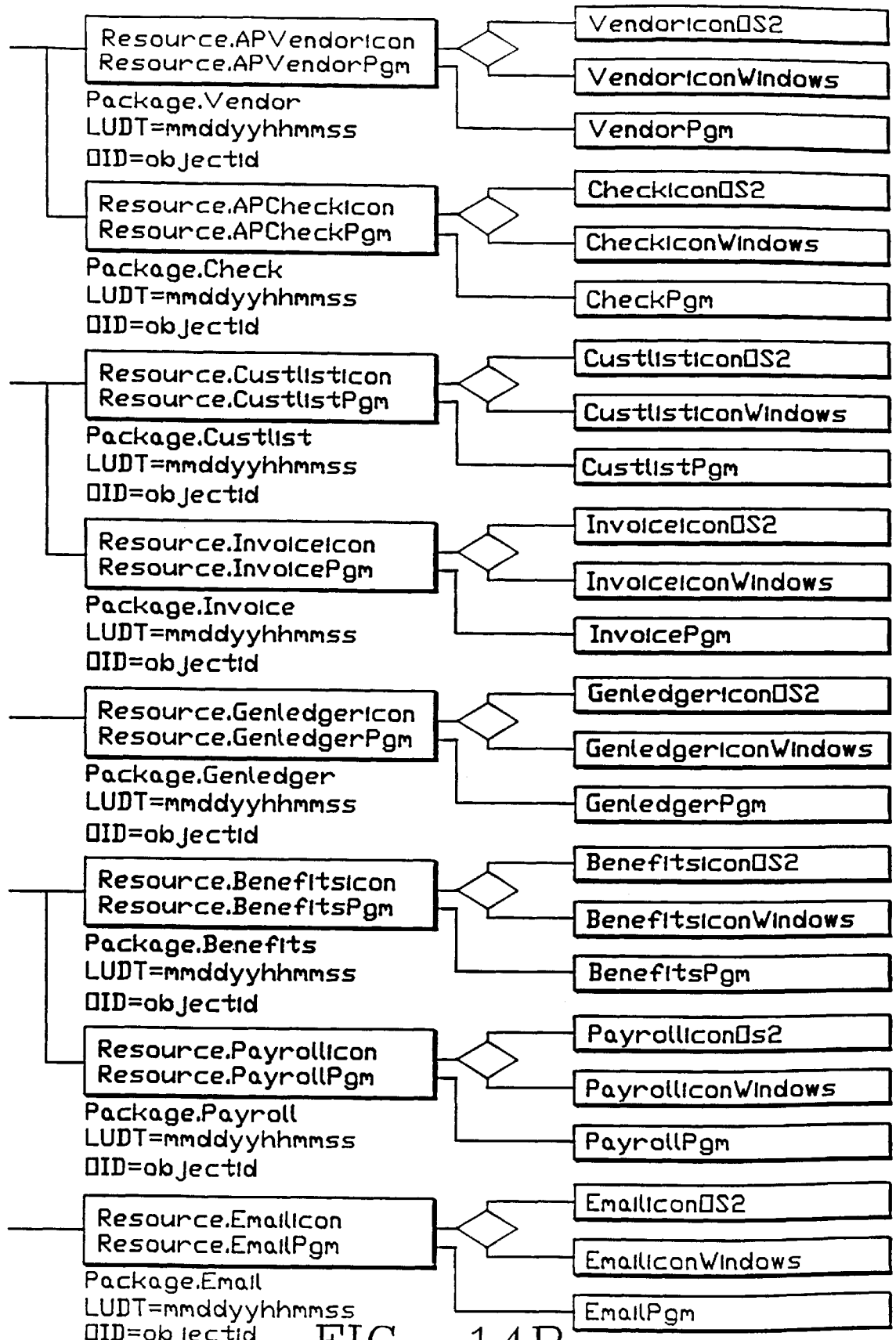
FIG.—14B

Figure 17 Already Have (Ah) List

| | | | |
|---|---|---|---|
| Variable name : ZLUNAME | Length: 008 | Data...: | NVDLU109 |
| Variable name : AMEM | Length: 007 | Data...: | 655,360 |
| Variable name : BIOS | Length: 065 | Data...: | BIOS: 01/15/88 COPYRIGHT (C) |
| Variable name : BIOSEXT | Length: 079 | Data...: | BIOS EXTENTION FOUND AT: C000 |
| Variable name : CPUTYPE | Length: 005 | Data...: | 80486 |
| Variable name : DOSHMA | Length: 003 | Data...: | YES |
| Variable name : DOSVER | Length: 003 | Data...: | 5.0 |
| Variable name : DRIVE | Length: 002 | Data...: | 13 |
| Variable name : DRIVES | Length: 050 | Data...: | A, B, C, D, F, M, S, T, V, W |
| Variable name : EMSVER | Length: 004 | Data...: | 4.0 |
| Variable name : FPUTYPE | Length: 005 | Data...: | 80487 |
| Variable name : FREEC | Length: 020 | Data...: | 1,204,224 BYTES |
| Variable name : FREED | Length: 020 | Data...: | 323,706,880 BYTES |
| Variable name : GAME | Length: 002 | Data...: | 0 |
| Variable name : MOUSE | Length: 044 | Data...: | 2 BUTTON MOUSE FOUND (DRIVER) |
| Variable name : PARALLEL | Length: 002 | Data...: | 3 |
| Variable name : PGMSIZE | Length: 007 | Data...: | 504,912 |
| Variable name : SERIAL | Length: 002 | Data...: | 2 |
| Variable name : TMEM | Length: 007 | Data...: | 655,360 |
| Variable name : TOTALC | Length: 020 | Data...: | 255,692,800 BYTES |
| Variable name : EMSVER | Length: 004 | Data...: | 4.0 |
| Variable name : FPUTYPE | Length: 005 | Data...: | 80487 |
| Variable name : FREEC | Length: 020 | Data...: | 1,204,224 BYTES |
| Variable name : FREED | Length: 020 | Data...: | 323,706,880 BYTES |
| Variable name : GAME | Length: 002 | Data...: | 0 |
| Variable name : MOUSE | Length: 044 | Data...: | 2 BUTTON MOUSE FOUND (DRIVER) |
| Variable name : PARALLEL | Length: 002 | Data...: | 3 |
| Variable name : PGMSIZE | Length: 007 | Data...: | 504,912 |
| Variable name : SERIAL | Length: 002 | Data...: | 2 |
| Variable name : TMEM | Length: 007 | Data...: | 655,360 |
| Variable name : TOTALC | Length: 020 | Data...: | 255,692,800 BYTES |
| Variable name : TOTALD | Length: 020 | Data...: | 424,460,288 BYTES |
| Variable name : TOTXMEM | Length: 010 | Data...: | 15,728,640 |
| Variable name : VIDEO | Length: 023 | Data...: | VGA VIDEO ADAPTER CARD |
| Variable name : XMSAMEM | Length: 010 | Data...: | 1,048,576 |
| Variable name : XMSTMEM | Length: 010 | Data...: | 1,048,576 |
| Variable name : XMSVER | Length: 004 | Data...: | 2.00 |
| Variable name : ZOBJNAME | Length: 013 | Data...: | HARDWARE_SCAN |
| Variable name : ZUSERID | Length: 008 | Data...: | MITCH |
| Variable name : ZOS | Length: 004 | Data...: | OS/2 |

Enter Variable name......:

FIG.—19

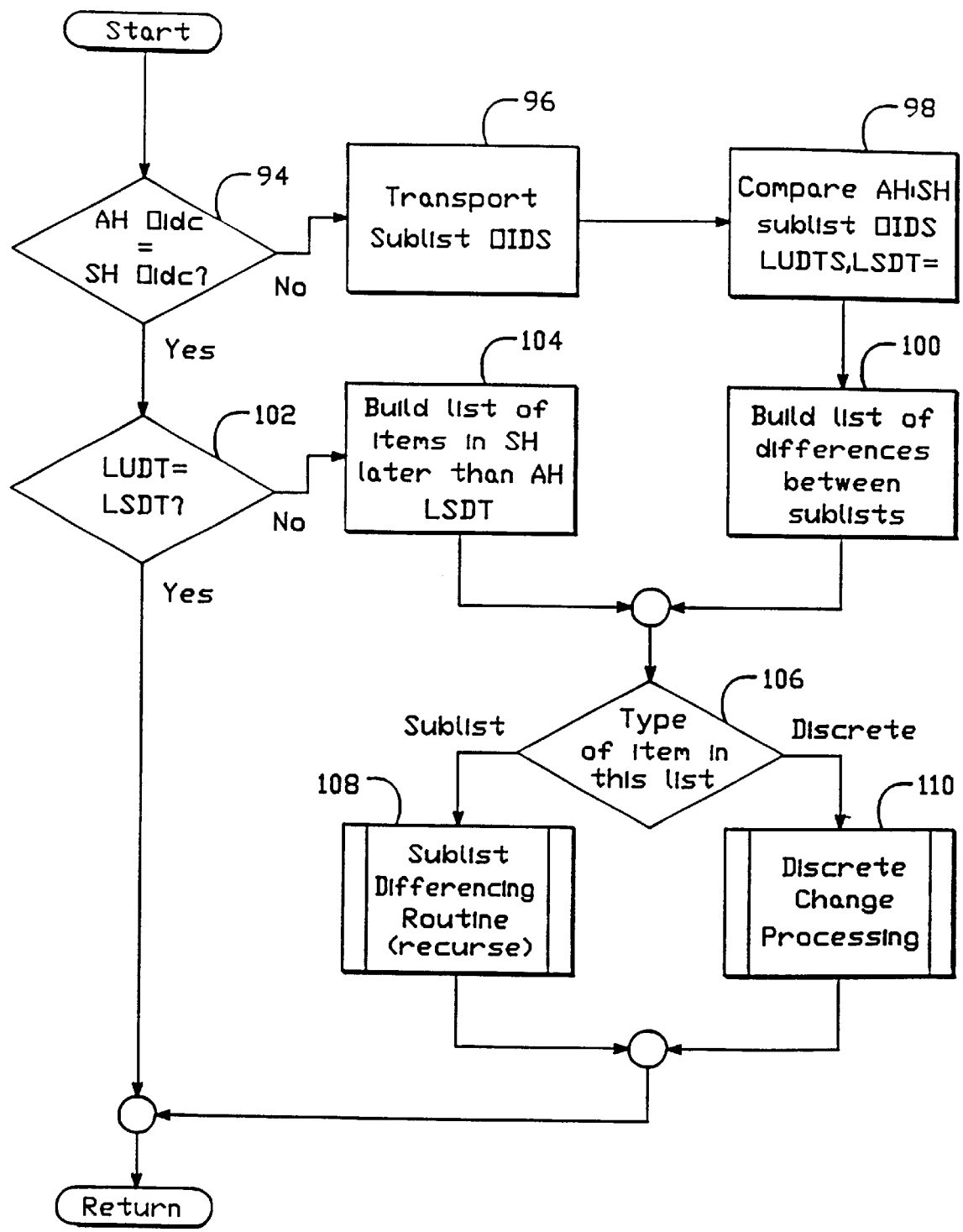
FIG.—24

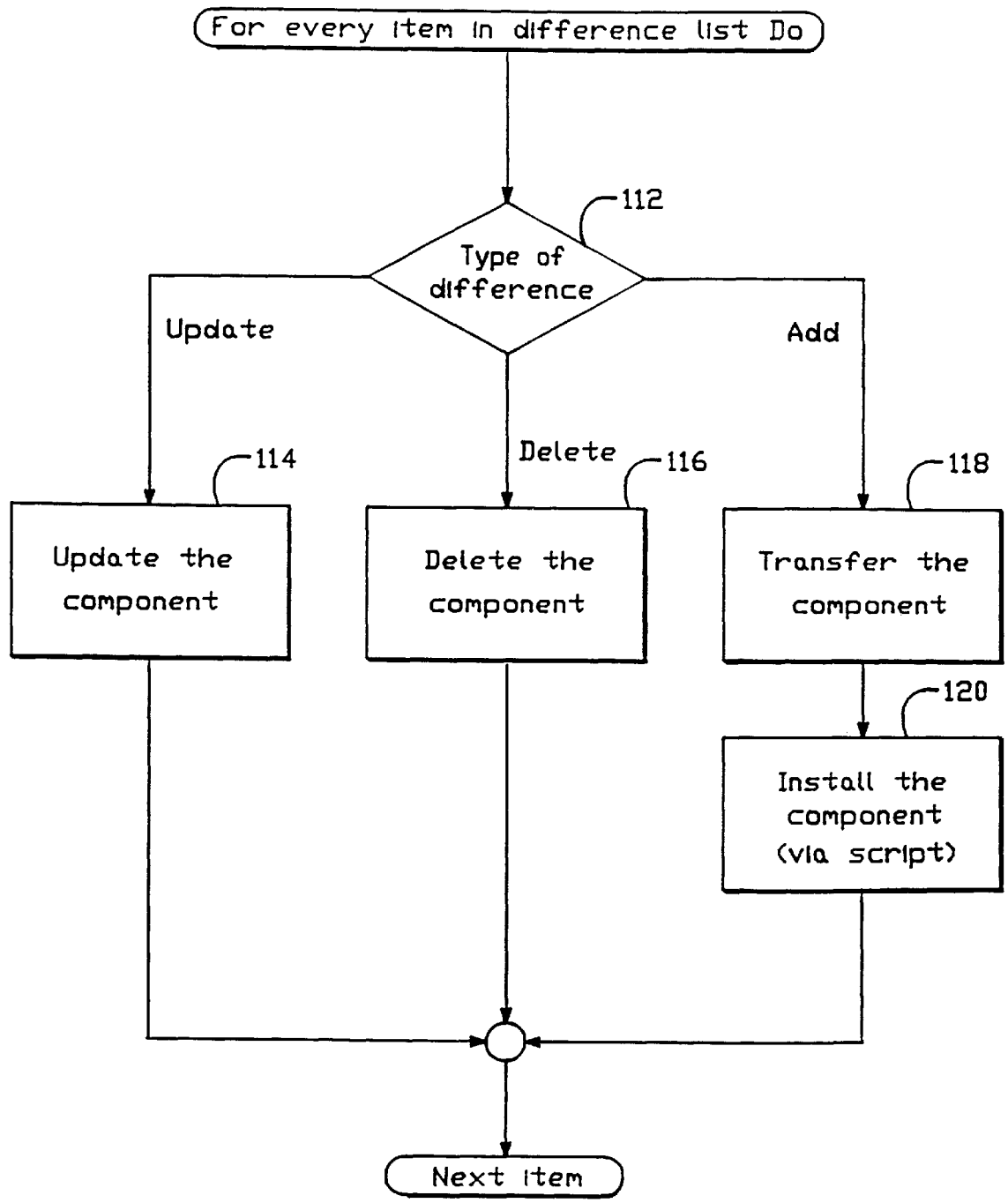
FIG.—25

DISTRIBUTED COMPUTER NETWORK INCLUDING HIERARCHICAL RESOURCE INFORMATION STRUCTURE AND RELATED METHOD OF DISTRIBUTING RESOURCES

CROSS-REFERENCE TO RELATED PATENT APPLICATION

This application is a continuation of application Ser. No. 08/756,730, filed Nov. 26, 1996 now abandoned, which is a continuation of Ser. No. 08/237,498 filed May 2, 1994 now U.S. Pat. No. 5,581,764, which is a continuation-in-part of application Ser. No. 08/056,333 filed Apr. 30, 1993, now abandoned.

FIELD OF THE INVENTION

The invention relates generally to computer networks, and more particularly, to the highly automated central management of resources contained on computers connected to the network.

DESCRIPTION OF THE RELATED ART

A. Traditional Data Centers and Networks

As large scale corporate computing has evolved, on-line systems and applications have been made increasingly available to virtually all segments of commerce through the widespread proliferation of desktop computers linked via telecommunication networks to centralized computing centers. Traditionally, these networks have been centrally managed as part of the responsibilities of an information technology administrative center. The complexity of managing strategically vital computing resources; managing significant numbers of critical business applications and their associated data; providing networked desktop computer access to the appropriate systems and applications; and all the while safeguarding the integrity, security, and availability of such assets have been some of the most significant challenges addressed by both the information management and the computer science disciplines.

Systems management software which traditionally has run on centralized computing centers typically is involved with tasks such as, library and configuration management, version control, resource security, network control, data and storage management, job scheduling, session management, resource monitoring and reporting. Much of the earlier distributed systems management software was developed to operate in highly structured environments readily susceptible to centralized control. In the past, users at desktop computers on the network often had relatively little flexibility in configuring their personal desktop computers (their "desktops") to meet their specific needs.

Recently, the revolutionary strides in hardware and software technology and in the human-to-computer interface have made an enormous range of different application programs available for desktop use on personal computers. Moreover, desktop computers have become so easy to operate that users have come to rely upon them for a broad array of specialized tasks such as word processing, spread sheet analysis and personal information management. The proliferation of application programs for desktop computers and the wide usage of computers in vast networks continues to make the job of managing networks ever more challenging.

Referring to the illustrative drawing of FIG. 1, there is shown an illustrative block diagram of a typical distributed computing environment, with a central computer which manages application software and network activities for a network which comprises a multiplicity of end-terminals such as desktop personal computers. A typical data center includes a central computer, often a powerful mainframe computer, and one or more administrative computer terminals. Ordinarily, programs such as security management programs, configuration change management programs, library management programs and presentation management programs run on the central computer.

B. Migration of Data Center Functions to the Desktop

The development of more powerful desktop personal computers has led to the migration of many functions to the desktop computer. In the past, these functions were managed by a central computer located in the data center. The migration of functions to the desktop has been spurred by the advent of the graphical user interfaces (GUIs) which represent a computing environment in terms of simple pictures in which applications and other resources are depicted as icons to be manipulated. A GUI can permit a user to interact with images on a computer screen in much the same way that he would interact with a real object such as a telephone, a file folder, or other objects that often can be found on a real desk. The resulting easily understood and intuitive environment provides the foundation upon which innumerable new robust and powerful application programs have been built.

As a result, desktop computer users have come to demand from their desktop computers much of the computing functionality that once was reserved for centralized computers and computer centers. In addition, many existing centralized computer applications, and much data critical to an organization, often must be accessible to newly emerging client/server applications. For example, a desktop application for use in sales analysis may require access to product ordering and availability information that is managed by a central computer. Alternatively, for example, a desktop spread sheet application may need data stored in a central database.

In short, a central computer often is called upon to serve as a central repository of services and data that are to be available to different departments within an organization. Different departments often have different needs, and the challenge of centralized management increases as individual users within departments are able to specify their individual needs with greater particularity. Thus, the managers of networks of distributed desktop computers increasingly are being called upon to support a wide range of end-user involvement with the desktop, most notably the productivity enhancements of personalized desktop computing.

C. Deployment Management Issues

The deployment issues in centralized systems management include the configuration of networked desktop computers, distribution of resources and ongoing maintenance of distributed desktop resources. Once a desktop computer has been configured with the proper resources, those resources must be properly maintained. One of the challenges confronting in centralized systems management is that there may be a large variety of software resources available on the network and a large number of desktops. The question of, "who gets what?", can be a difficult one. The complexity of this question increases with the need to specify not only which application programs should be available at which desktops but also by issues such as which version of an application to use, security, policy based limitations and compatibility.

The lack of sufficiently automated technology to dynamically reconfigure any or all desktop computers in a network on an as-required basis can be a significant systems management shortcoming that can slow an entire enterprise's responsiveness to changing technical and business requirements. For example, in the banking industry, computer software based training information may have to be distributed to hundreds of branch offices and may have to be kept current with changes in bank lending policies and banking regulations. In such a banking scenario, for example, the efficient distribution and updating of the software is critical. Failure to promptly distribute new lending policies or new banking regulations to all branches could have serious harmful business consequences. As the number of distributed computers and the complexity and variety of their resource configurations grow, the lack of sufficiently automated technology to perform these distributions can result in unacceptable delays or large administrative personnel costs.

Referring to the illustrative drawing of FIG. 2, there is shown an exemplary centralized configuration management structure. It includes multiple administrator computer terminals and multiple desktop computers, all of which are connected to a central computer. The administrator terminals allow network administrative personnel to manage the desktops. The central computer provides a centralized locale for the distribution of applications and data to the desktops. The management of such resources can entail maintaining lists of resources available to the desktop computers; or the maintenance of rules for the use of resources on the desktop computers.

U.S. Pat. No. 5,282,273 issued to Ushio, et al., for example, describes an Enterprise Information System Having Three Level Hierarcy Of Data Bases And Communication Paths. The '273 patent discusses problems that arise from efforts aimed at the integrated management of information in an enterprise. It teaches the use of three types of data bases and three types of communication paths to manage the enterprise. This Hierarchy provides an example of a possible architecture for an earlier enterprise-wide information network.

D. Simultaneous Management of Policy Based and Technology Based Resource Deployment Issues An important goal in centralized systems management is to make certain that the resources possessed by each desktop match the resources that the desktop should possess based upon both policy and technology considerations. For example, a desktop user's access to a resource could be constrained by policies, such as policies governing which users and which departments can have access to certain application functions and what business or technical data are to be treated as confidential. A desktop user's access to resources also could depend upon technology issues such as, for example, which operating system is employed on the desktop computer or how much disk space is available on that desktop.

Thus, for example, an initial deployment of a distributed computing application may require a determination by a policy administrator of which users are authorized to utilize the application, followed by a determination by a technical administrator of the particular version of the application software appropriate for that particular user's desktop. The product of these determinations in the common automated distribution approach ordinarily comprises a "Need" list of components, or "resources" prepared by a distribution administrator that must be transported to a user's desktop computer over a network connection. The distribution administrator typically prepares a list of users' computers that require that same "Need" list of components (because, presumably, the users all share the same policy and desktop environment requirements) and typically utilizes a "distribution" program together with these "Need" lists to automate the transportation and installation of the components at the desktop computers.

E. The Challenge of Automated Change Management

Managing the distribution of resources to a multiplicity of individualized desktop computers throughout an organization based upon both policy and technology factors is challenging enough. The task is complicated, however, by the fact that the technology configuration (e.g., operating systems, disk space, CPU type) of individual desktops and the organization's policies about who should have what computing applications, as well as the components of the computing applications themselves, can, and do, change with great frequency. Consequently, the desktop resources must be updated to reflect these changes.

Historically, the approach to managing change has been only partially automated. A distribution administrator creates lists of resources that need to be changed based upon the "last known" desktop technology configurations for multiple desktops and based upon lists of "last known" authorized users of the resources. A distribution program is used to distribute these "Need" lists in order to update the desktops e.g., to distribute new applications or to update previously distributed applications. As in the typical initial deployment process, the distribution administrator manually creates the "Need" lists necessary to instruct the distribution program about what resources to alter for which desktops. This manual list-creation process for changes typically attempts to utilize lists created previously for the initial deployment. Unfortunately, the use of previously developed authorization lists and desktop configuration lists creates the possibility of introducing errors into the change process because one or more user authorizations may have been changed since the list was created, or because the configurations of one or more desktops may have changed.

The inherent difficulties in keeping track of changing policies and desktop configurations have prompted some enterprises to enforce a high degree of standardization and a low rate of change in policies, desktop configurations, and resource components. In effect, the organization limits changes in its network environment because such change is so difficult to manage. Unfortunately, limiting change and promoting standardization runs directly counter to the current computer culture which encourages the proliferation of personalized desktop configurations as well as the need for rapid changes to user computing environments in keeping pace with the rapid evolution of desktop computing application technology.

F. List Based Change Management

The illustrative drawing of FIG. 3 shows an earlier method for managing and maintaining stored lists of resources and utilizing them to automate the creation of "Need" lists. A list designated as the "Already Have" (AH) list is created and saved for each desktop. The AH list lists resources that a desktop already has. Such resources may have been transported to the desktop during an initial deployment or an intervening change activity. Another list designated as the "Should Have" (SH) list can be generated by administrative personnel. The SH list lists resources that a desktop should have. This list itemizes the resources that should be available to the desktop for all authorized activities for that desktop. The AH lists are stored at either the central computer or at the local desktops. Ordinarily, the SH lists are stored centrally or at the administrative computer that created them. However, the storage location of the AH and SH lists usually is not critical.

A "Need" list may then be generated by comparing the AH list with the SH list. Items contained in the SH list that are absent from the AH list are included in the "Need" list. For example, in FIG. 3, the "Need" list indicates an addition of a new item designated as "ggg" which is listed in the SH list but which is not listed in the AH list. The "Need" list also sets forth items which are present in the AH list, but which have been updated in the SH list. These updated items in the "Need" list are to replace corresponding items in the AH list. For example, the item listed as "aaa" in the SH list was last updated on date, May 1, 1992, at time, 12:13:45 o'clock. The corresponding item indicated as "aaa" in the AH list was last updated on date, Mar. 1, 1992, at time, 12:13:45 o'clock. Since the SH list contains the more up-to-date item, the AH list requires updating. Thus, the "Need" list includes the item "aaa" as updated on May 1, 1992 at 12:13:45 o'clock which will supplant the item "aaa" item last updated Mar. 1, 1992. Moreover, the "Need" list identifies items that are present in the AH list but absent from the SH list, and which, therefore, must be deleted from the desktop. The item "fff" is listed in the "Need" list as requiring deletion from the AH list.

The items listed in the AH list, such as for example, "ddd" can represent resource names or pointers to resources or data sets. The dates and times adjacent to such items indicate the currency level of the resource. For example, the item identified as "ddd" in the SH list was last updated on the day of May 14, 1992 at 13:11:45 O'clock. The "Need" list identifies resource deletions, additions and updates necessary to configure a desktop computer in accordance with administrator requirements designated in the SH list.

Thus, the above-described earlier process of configuring a desktop computer involves determining what resources the desktop already has; determining what resources the desktop should have; and based on a comparison of the AH and SH resources, producing a "Need" list that indicates what resources the desktop must add, delete or update. Once a "Need" list is generated, it is used together with an automated distribution program to manage the process of deleting resources from the desktop or of adding resources to the desktop or of updating resources on the desktop. The process of deleting, adding or updating resources can involve transporting new or updated versions of programs or data over the network and deleting no longer needed versions of programs or data from the desktop. The types of resources that can be deleted, added or updated include virtually any information that can be transported over the network such as programs, data, icons and batch files.

One problem with the type of lists described with reference to FIG. 3 is that the addition, deletion and updating of desktop resources can involve the comparing of entire SH lists to entire AH lists for a large number of desktops which can involve large network transport overhead. The complexity of the search/comparison task increases both with the number of desktops and with the number of resources managed. Referring to the illustrative drawings of FIG. 4, there is shown a proliferation of AH lists and of corresponding SH lists. Each AH list and each corresponding SH list relates to a different desktop. The process explained with reference to FIG. 3 is performed for every desktop in the network. However, as the number and complexity of different desktop configurations and the number of resources involved increase, this process by itself can become practically infeasible because of the clerical issues involved in maintaining individual SH lists and the computing and network overhead required to perform the SH to AH comparisons for each desktop.

An earlier approach to simplifying the management of large numbers of desktops and resources is to group desktop computers together to reduce the number of lists. Instead of maintaining a different AH and SH list for each desktop, different AH and SH lists are maintained for groups of desktops. As a result, the total number of AH and SH lists is reduced. However, such grouping involves standardization of the resources available to groupings of desktops. This standardization limits the policy administrators' ability to control individual user access to only appropriate applications as well as users' ability to customize their individual desktops. Another similar alternative uses a rules-based approach to the grouping of desktops. For example, desktops could be divided into groups, and rules could be imposed which assign one set of resources to one group and another set of resources to another group. The result, however, is the same: limitations on policy enforcement and in users' ability to customize their individual desktops.

The grouping of resources facilitates the use of structured SH lists which are SH lists made up of sub-lists. Structured SH lists can reduce storage requirements and manual effort for SH lists by obviating the need to store and maintain a separate set of lists for each desktop. The use of structured SH lists also can simplify the implementation of changes, since changes to a single structured list can have effect across numerous desktops on the network. Rather than making individual changes for individual desktops, a single set of changes can influence many desktops.

Referring to the illustrative drawings of FIG. 5, there is shown an SH list which is a composite of two sub-lists. As illustrated in FIG. 6, sub-lists can be shared among SH lists. Items can be grouped into sub-lists by an administrator based on an analysis of resource sharing among desktops. When a desktop request for a configuration activity prompts a comparison of a SH list for a desktop with the AH list for that desktop, then the SH list can be generated from the master list and the sub-lists.

One difficulty with automating the SH list generation process has been that different desktops can have different hardware and software platforms. Thus, the SH list generation process frequently involves a clerical task in which administrative personnel determine which resources a desktop should have.

In order to ease the administrative burden of generating SH lists, desktops often are grouped together and share common SH lists. Once the SH list has been generated for a desktop or a group of desktops, then the SH list can be compared to the AH lists of the individual desktops to generate "Need" lists. However, as explained above, grouping of desktops involves a cost in terms of granularity of the available resources: desktop users may be relegated to the nearest fit sub-list or the least common denominator of sub-lists due to an inability to fully articulate and manage the specific desktop user configuration requirements for individual desktops.

Another problem with the use of structured SH lists is that the desktop platform may change, and resources identified in a SH sub-list may be inappropriate in the changed desktop platform. The desktop computer configuration could change in numerous ways. For example, the operating system might change between DOS, Windows and OS/2. The central processing unit (CPU) might change among X386, X486 and Pentium types. The printer might change between laser and dot matrix. The number of disk drives might change. The amount of memory might change. Word processing software might change between Word and WordPerfect.

Spreadsheet software might change between Lotus 1-2-3 and Excel. Other exemplary changeable desktop components include a mouse, keyboard, modem and CD-player.

Similarly, the policies applicable to a desktop computer user could change. For example, an employee could be transferred from the accounts receivable department to the accounts payable department. As a result, for example, that user might now have access to the Vendor List application but would not have access to the Customer List application. Whereas, prior to the transfer, that same user would have had access to the Customer List Application but would not have had access to the Vendor List application.

Rules-based lists can be more dynamic in that they can accommodate such changes automatically. For example, rules like "if printer type A then use SH sub-list A, and if printer type B, then use sub-List B," could be applied. However, such rules can require additional programming effort by network administrative personnel to anticipate and to program rules appropriate for the multitude of potential desktop platform changes.

Therefore, there has been a need for an improved and automated configuration process that permits dynamic reconfiguration of a desktop based upon policy changes and desktop technology configuration changes. The present invention meets this need.

There also has been a need to optimize the process of comparing SH lists with AH lists to determine what resources must be added, deleted or updated on a desktop computer. This need is particularly acute in networks having a large number of desktop computers and a large number of variable resources. In such large networks, a one-to-one approach of matching an AH list against a generated SH list for a large number of desktops and a large number of resources can be storage, processing and network transport intensive. For example, if there are 5,000 desktops and 1,000 possible resources, then there could be five million records in the AH and SH lists. If there are 100 characters per record then a Gigabyte of data might have to be stored. The present invention also meets the need to improve the comparison process.

SUMMARY OF THE INVENTION

A system in accordance with the present invention determines the resource needs of individual distributed computers based upon a Should Have (SH) list (or object) Schema. The SH list Schema is used to produce SH lists for individual distributed computers. Individual Already Have (AH) lists can be stored or can be produced at configuration time for individual distributed computers. A novel differencing process is used to locate differences between SH lists (or objects) and AH lists (or objects) for the individual distributed computers. The differences between SH lists and AH lists for the individual distributed computers are used to determine what items must be compared in order to update individual desktops.

In one aspect of the invention, dynamic linkage substitution can be used to facilitate the resolution of an SH list for an individual distributed computer from a generalized SH list Schema so as to meet the current needs of that individual distributed computer. In another aspect of the invention, date comparisons are employed during the differencing process to detect and isolate the sub-lists (or objects) for which there have been changes in the Schema or AH list for a particular distributed computer and thus to obviate the need for direct comparisons of AH list items with SH list items to identify such changes. In still another aspect, a checksum technique is used during the differencing process to detect and isolate the sub-lists (or objects) of an SH list which have changed for a particular distributed computer as a result of changes in dynamic linkage values and/or the actions of administrative personnel.

The present invention automates the management of changes in a distributed computing environment. It can construct "Need" lists for distributed computers based on the interrogation of individual distributed computer configurations. Integral to this automation is the calculation of differences between already distributed resources and resources that should be on the distributed computer.

These and other purposes and advantages of the present invention will become more apparent to those skilled in the art from the following detailed description in conjunction with the appended drawings.

BRIEF DESCRIPTION OF THE DRAWINGS

FIG. 4 is an illustrative drawing showing the potential for a proliferation of AH lists and SH lists for a network that includes a multitude of desktops;

FIG. 5 is an illustrative drawing showing the use of a structured SH list which comprises two sub-lists; the SH list is compared with an AH list to arrive at a Need list;

FIG. 6 is an illustrative drawing which shows the sharing of sub-lists among different structured SH lists;

FIG. 7A shows a Schema with a dynamic linkage; FIG. 7B shows an SH list resolved from the Schema of FIG. 7A;

FIG. 9 illustrates a Last Updated Date/Time (LUDT) field in an SH list and a Last Synchronized Date/Time (LSDT) field in an AH list in accordance with the invention;

FIGS. 13A–B illustrate an exemplary Schema which contains technology based dynamic linkages in accordance with the present invention;

FIGS. 14A–B illustrate an exemplary Schema which contains both a policy based dynamic linkage and technology based dynamic linkages;

FIG. 19 illustrates the output of a typical desktop interrogation program;

FIG. 24 is an illustrative flow diagram of a Sub-list Differencing Routine in accordance with the present invention; and FIG. 25 is an illustrative flow diagram of a Discrete Change Processing Routine in accordance with the present invention.

DETAILED DESCRIPTION OF THE PREFERRED EMBODIMENT

Figure 1:
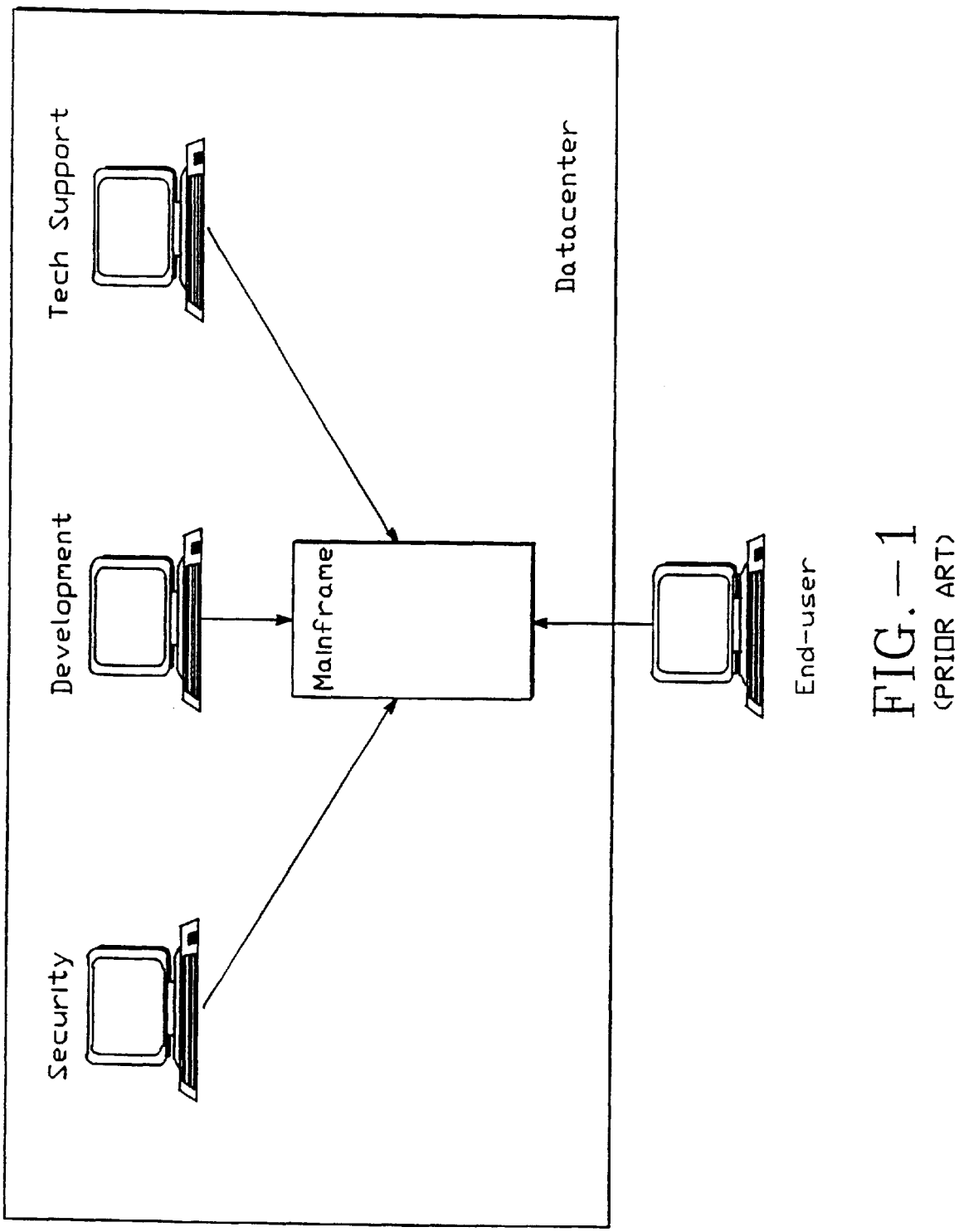
FIG. 1 is a block diagram illustrating the relationship between a datacenter which includes administrator terminals and a mainframe computer, and end-users with desktop computers.
Figure 2:
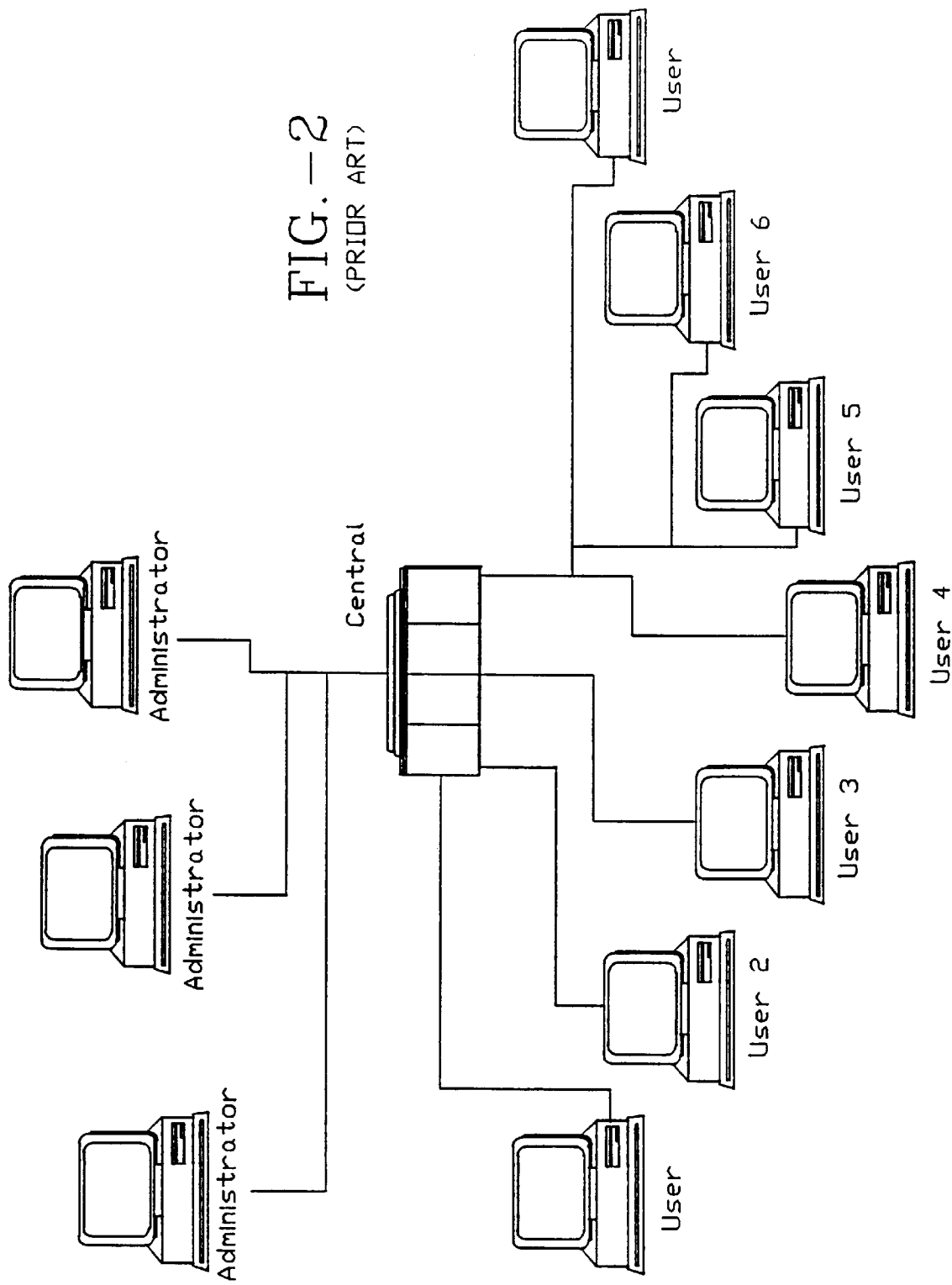
FIG. 2 is a generalized drawing of a typical enterprise management structure which includes a central computer administered through multiple administrator terminals and which further includes a multitude of desktops.
Figure 3:
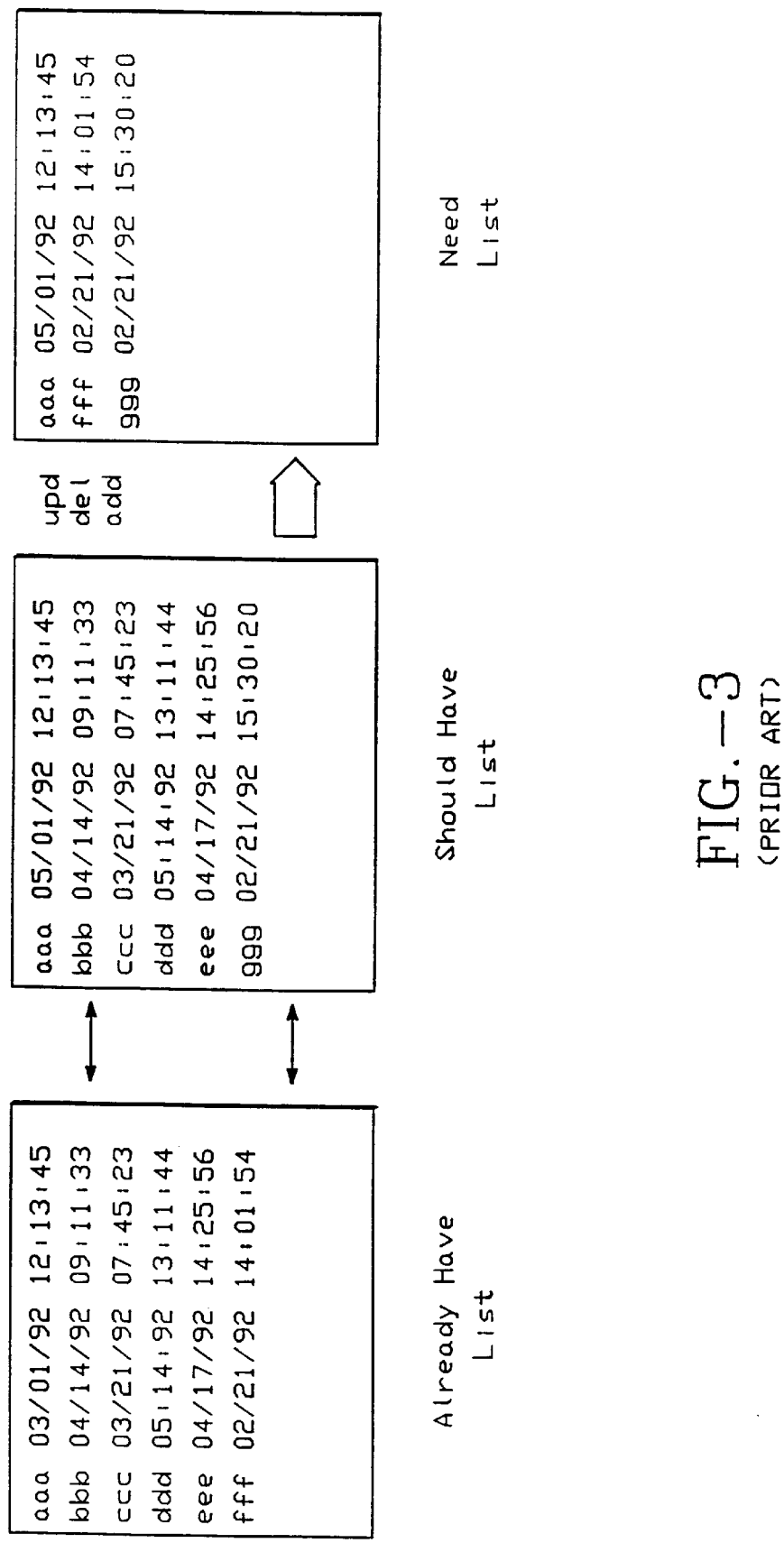
FIG. 3 is an illustrative drawing showing that a comparison of an Already Have list and a Should Have list results in a Need list which itemizes discrepancies between the AH and SH lists.

The present invention comprises a novel method and system for centralized system management of the resources of distributed computers. The following description is presented to enable any person skilled in the art to make and use the invention, and is provided in the context of particular applications and their requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Distributed Computers

The method and system of the present invention are used to configure computers distributed geographically around an organization and connected through a transport medium or network. The most common type of "distributed computer" is the desktop personal computer, referred to herein as a "desktop". However, it should be understood that the invention can be used to configure virtually any distributed computer such as, for example, LAN servers, multiple main frame computers, laptop computers, work stations and computers connected using wireless techniques.

Transport Media

The techniques of the present invention operate with standard network transport and remote installation mechanisms. The transport medium can be a wide area network, local area network, dial-up network or a wireless network, for example. However, the process of the invention does not require real-time transport of information over a network. For example, information such as AH list and variable values or updates for an AH list can be physically transported via courier or mail service using CD ROM, diskettes or other portable storage media. Moreover, the transport medium may include a real-time network in combination with such portable storage media.

In order to set up a desktop computer using centralized control, resources are transported using a transport medium, such as a network, to the desktop. Resources, for example, may be remotely installed over a network using software "Scripts" which are well known standard or custom procedures used in remote software installation. For example, an application such as a word processing program might contain 50 files. These 50 files can be bundled into one Service list or object which, for example, may be identified as a particular word processing program. In order to install this Service at a particular desktop, all 50 files would be transported from a central control point together with a software Script which is used to install the 50 files together with associated icons, folders, etc.

The network transport mechanism and the software Scripts used for installing Services transported over a real-time network are invoked after a determination has been made in accordance with the system and processes of the present invention as to what resources need to be transported to a desktop. Thus, the present invention involves a system process for determining what resources a desktop needs. The mechanisms for transport of resources over the network, and the mechanism for actual installation of resources on a desktop are routine and well known and need not be described further herein.

Should Have List Schema

Figure 7B:
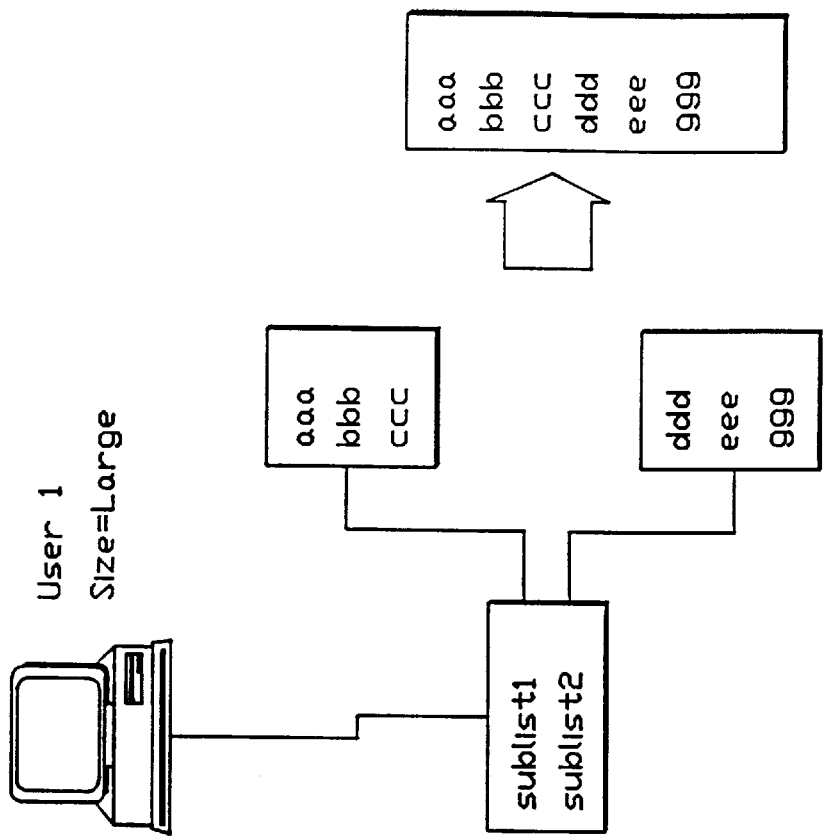
FIGS. 7A–B show drawings which illustrate the resolution of a dynamic linkage as part of the process of generating an SH list from sub-lists in accordance with the present invention.
Figure 7A:
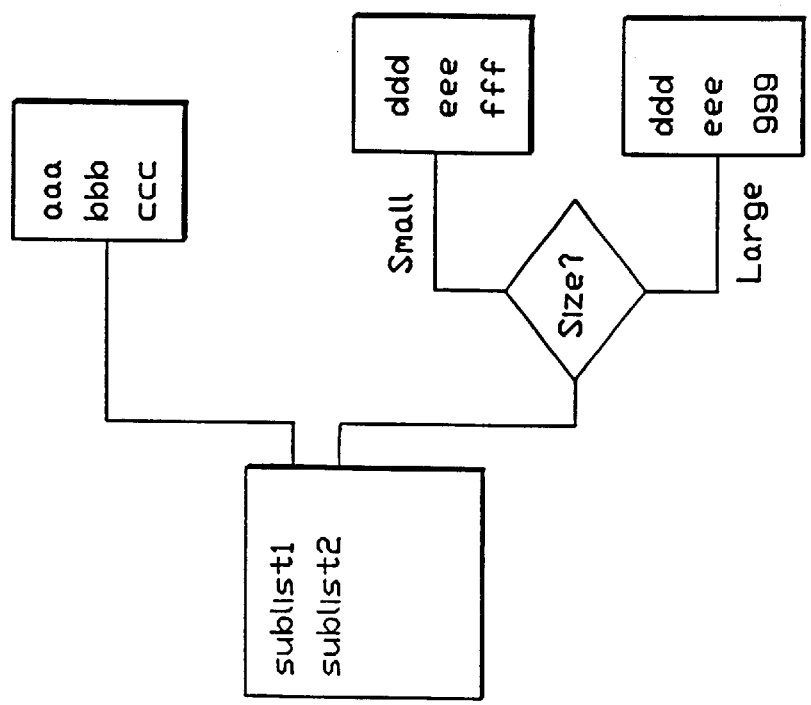

Referring to the illustrative drawings of FIG. 7A, there is shown a representative Should Have (SH) list Schema in accordance with the present invention. The Schema represents sets of relationships used to produce SH lists for individual distributed computers. The Schema in essence is a shared data structure. The shared Schema is shared in the distributed network. The Schema joins policy and technology considerations using dynamic linkages in order to dynamically produce Should Have (SH) lists for independent desktops. For each desktop, the Schema can be used to resolve individual SH lists for individual desktops. The Schema can be constructed from a variety of ordinary building block components such as lists or objects.

Interrogation Process

The interrogation process employs standard techniques to obtain information to be used in the SH list resolution for individual desktops. The information obtained is used to assign values to specifically named variables, which are then used during SH list resolution to resolve dynamic linkages with matching variable names. The target of the interrogation process can be the desktop itself (i.e. the physical attributes of the desktop—processor type, printer, monitor type, etc.); a security system (e.g. IBM Resource Access Control Facility (RACF), Computer Associates-ACF2 or Top Secret), a directory system (e.g. Novell Bindery Services), or any other information source available through a standard interface or programming procedure. It can also be a database source available through a standard interface or programming procedure. It can also be a database or file containing information that can be read ("interrogated") to extract information necessary to correctly configure the desktop. The user can also be interrogated for information such as User ID, Password New Password, Department, Floor, Physical Location, etc. A PCMCIA card or some other form of portable media can be interrogated for information relating to proof of identity (as well as other types of ID verification, e.g. electronic signature verification, magnetic card reader, challenged response devices). An output of a typical desktop interrogation program is shown in FIG. 19. Some typical information obtained and its' source would be:

| Type of Information | Source |
|---|---|
| CPU Type | Desktop |
| Operating System | Desktop |
| Memory Size | Desktop |
| Monitor Type | Desktop |
| # of Hard Drives | Desktop |
| Location | Novell Bindery |
| User's Department | RACF/ACF2/TopSecret |
| User's Account # | RACF/ACF2/TopSecret |
| User's Workgroup | RACF/ACF2/TopSecret |
| Services Allowed | RACF/ACF2/TopSecret, Novell Bindery |
| User | User |
| Password | User |
| Network Address | Network Adaptor Card |

Referring to the illustrative drawings of FIG. 19, there is shown the output of a typical interrogation program in accordance with the present invention. The output is representative of a the type of interrogation program that interrogates a desktop as to its technology configuration. The output in FIG. 19 is produced in response to standard program calls to the desktop. The "Length" field indicates the length of the variable value. The "Data" field shows the actual variable value.

Each "Variable name" represents a desktop resource which can change. For example, the Variable name AMEM represents the amount of memory available on the desktop. DOSVER represents the DOS version in use on the desktop. DRIVES identifies each disk drive available to the desktop. FPUTYPE identifies the coprocessor type. FREEC represents the amount of free space on the C Drive. GAME indicates whether or not the desktop has a game port. In this case, the "0" indicates that there is no game port. ZOS represents the operating system currently running on the desktop.

End-to-End Configuration Process Overview

Figure 20:
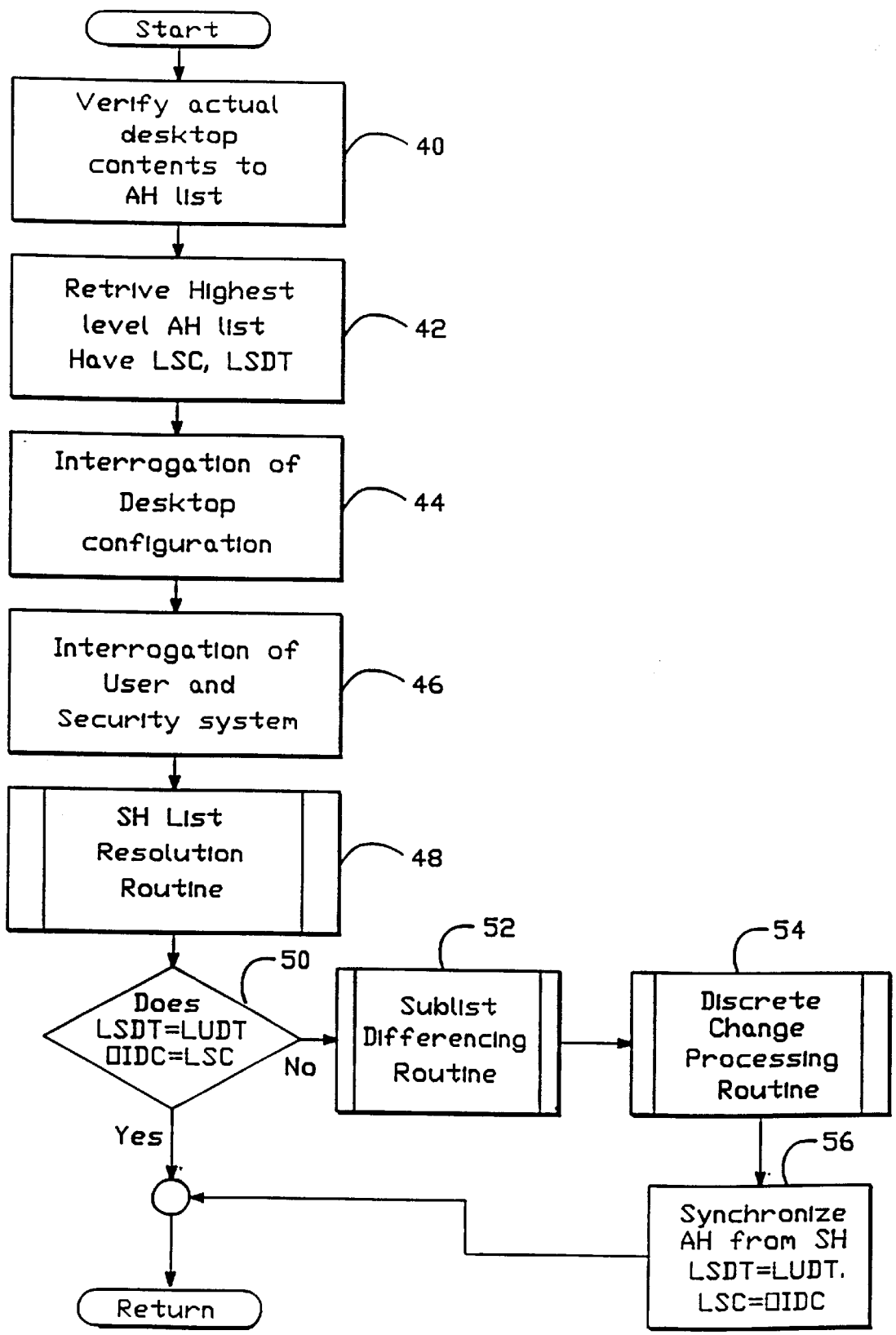
FIG. 20 is an illustrative flow diagram showing an overall, end-to-end, configuration process in accordance with the present invention.

The flow diagram of FIG. 20 provides an overview of the configuration process from end-to-end. Verify step 40 is optional (as indicated by the dashed lines). In step 40, the actual contents of the desktop may be verified at the beginning of the configuration process. Specifically, the desktop is interrogated at the file level to determine whether the previously generated AH list is still valid. If it is determined that the AH list previously generated no longer represents what actually is present on the desktop, then the previously generated AH list is revised to reflect the current desktop contents and the OIDs are changed, and changes are made to the appropriate OIDCs and LUDTs so as to indicate that the desktop in fact has changed. This verification step, for example, can be performed using interrogation software similar to that described above.

Figure 11:
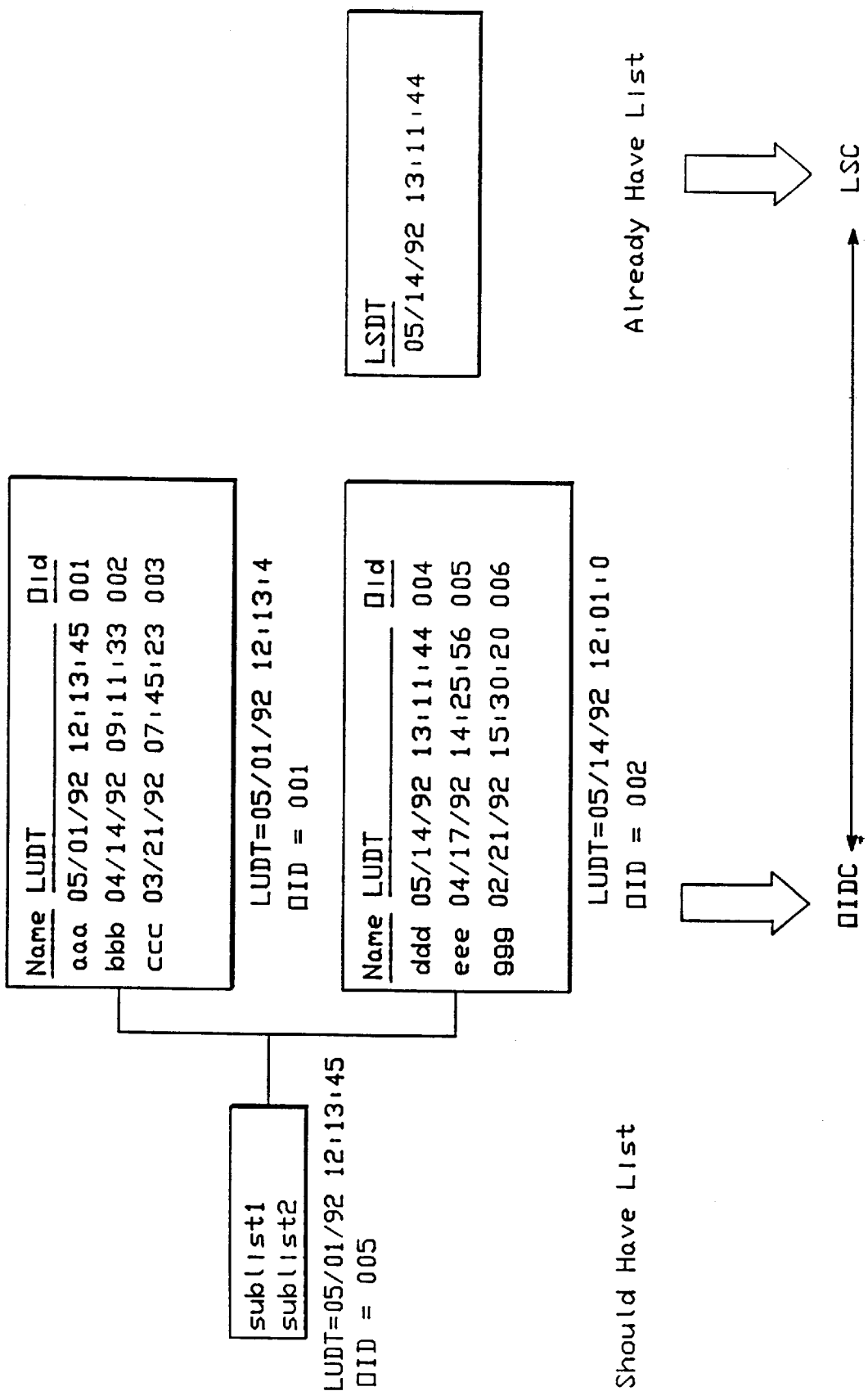
FIG. 11 illustrates the use of an Object Identity Checksum (OIDC) and a Last Synchronized Checksum (LSC) to detect dynamic linkage substitution in a Should Have list in accordance with the present invention.

In Retrieval Step 42, the OIDC and LSDT from the AH list for the desktop are retrieved. FIG. 9, for example, illustrates the retrieval of an LSDT for an AH list. FIG. 11, for example, illustrates the retrieval of an LSC for a AH list. Technology Interrogation Step 44 undertakes the desktop interrogation that results in an output of variable values such as that illustrated in FIG. 19. Policy Based Interrogation Step 46 undertakes a policy based interrogation of a User and the security system to elicit policy based variable values such as which Department a User belongs to as in FIG. 14A. This is an optional step (as indicated by the dashed lines).

Figure 22:
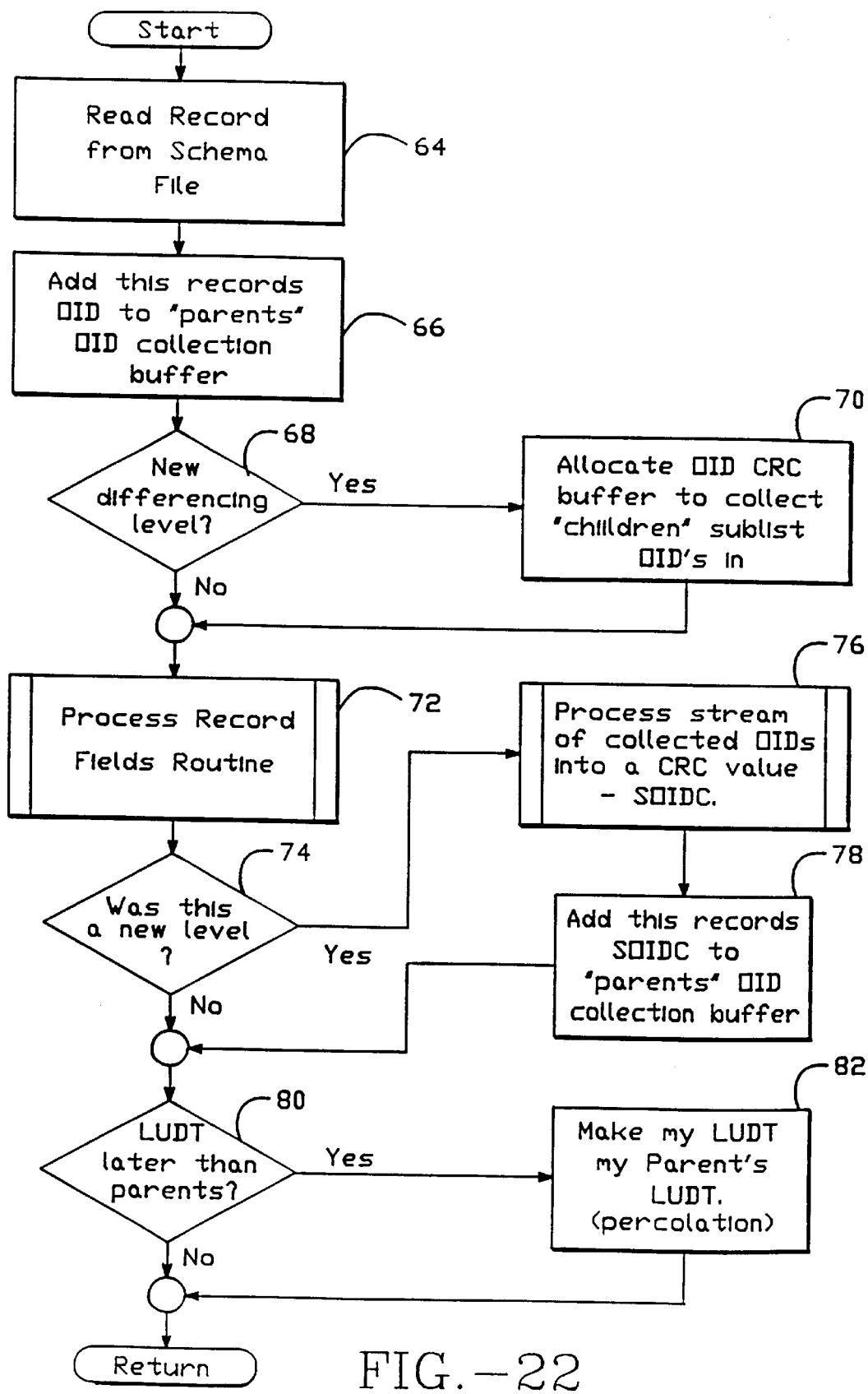
FIG. 22 is an illustrative flow diagram of a Should Have List Resolution Routine in accordance with the present invention.

Should Have Resolution Routine 48 is a process (as indicated by the vertical lines within box 48) which is explained in detail in FIG. 22. Step 48 resolves a SH list from a Schema such as the Schemas shown in FIGS. 7A, 8, 13A–B, and 14A–B. The resulting SH list can be a list such as that shown in FIG. 12 or such as that shown in FIG. 16, for example.

Decision Step 50 ascertains at the highest differencing node or highest level in the SH list whether or not there are differences between the SH list and the AH list. If either the LSDT does not equal the LUDT or the OIDC does not equal the LSC then a Sub-list Differencing Routine 52 is executed. This routine is illustrated with reference to FIG. 24. The purpose of the sub-list Differencing Routine is to isolate or zero in on the differences between the SH list and the AH list.

Once those differences have been identified then a Discrete Change Processing Routine 54 is executed. The Discrete Change Processing Routine is illustrated in FIG. 25. The purpose of that routine is to actually carry out the changes necessary to resolve the differences between the SH list and the AH list.

Synchronization Step 56 updates the LSDT and the LSC of the desktop AH lists. The LSDT is set to equal the LUDT of the resolved SH list. The LSC is set to equal the OIDC of the resolved SH list. Of course, if in Decision Step 50, the LSDT matches the LUDT, and the OIDC matches the LSC, then steps 52, 54 and 56 can be skipped.

Overview of the Process of Comparing AH List Structures To SH List Structures

Figure 21:
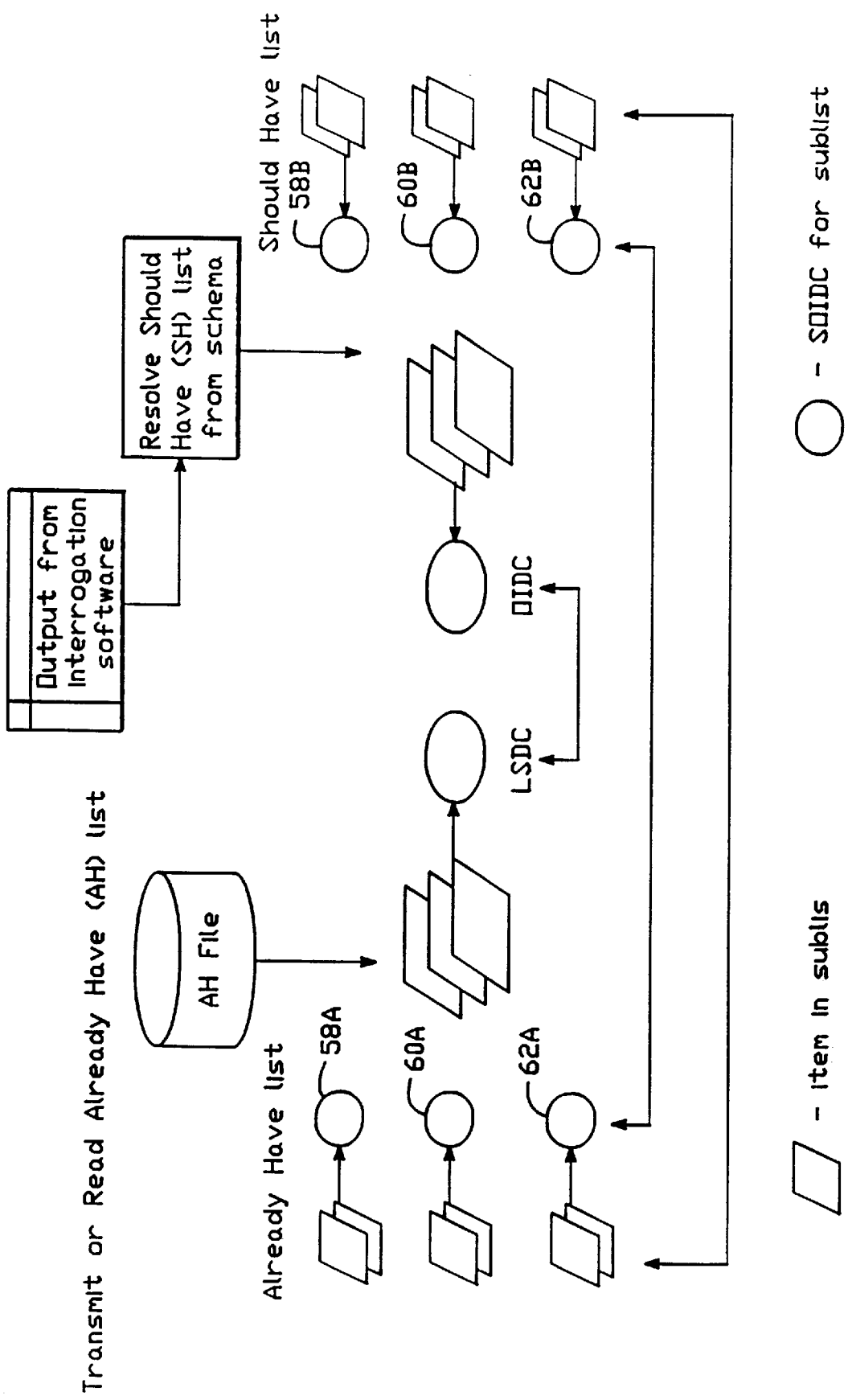
FIG. 21 is an conceptual view of a comparison of a SH list structure with an AH list structure in accordance with the present invention.

Referring to the illustrative drawing of FIG. 21, there is shown a generalized view of the AH list structures that are compared to the SH list structures. The AH list is obtained from an AH file stored in connection with a desktop that is to be configured. The AH file may be verified prior to the differencing process. The SH Schema is resolved with the benefit of input of interrogation software in order to produce an SH list. The highest differencing levels or decision points in the respective AH and SH lists are represented by the LSDC and the OIDC. If these match, then the structures of the AH list and the SH list match. If they do not match, then the structures of the AH list and the SH list are different. Resort then is made to the next decision level to isolate the locations in the AH list and the SH list where the differences actually exist.

This is accomplished by comparing respective OIDs of corresponding levels of the AH list and the SH list. For example, the AH list at decision point 58A is compared with the OID of decision point 58S. The OID of decision point 60A is compared with the OID of decision point 60S. The OID of decision point 62A is compared with the OID of decision point 62B.

Differences between OIDs at corresponding decision points or levels in the AH and SH lists indicates that the SH list has undergone a structural change, at or below that point or level, since the last time the AH list and the SH list were resolved. Further comparison is required where such structural changes are isolated. It should be appreciated that FIG. 21 only addresses the use of Checksums to identify structural changes and does not address the use of dates to identify changes in items on the desktop; the use of dates is described elsewhere in this document.

Adaptive List Generation Using Dynamic Substitution

The illustrative Schema of FIG. 7A is used for adaptive SH list generation using structured lists in accordance with the present invention. The Schema contains a dynamic linkage 30. In operation, a SH list for a particular desktop is adaptively generated from the Schema and the specific variables produced during the interrogation process for that desktop. That means that the dynamic linkage is made via the "Small" link or the "Large" link depending upon a value for a variable name "Size" created for the desktop by the interrogation software. A process of dynamic linkage substitution allows for the dynamic linkage of sub-lists (or objects) which can facilitate automatic adaptation of a SH list to predictable changes in the desktop configuration. That is, if the user changes the desktop environment, different variable name values will be presented to the Schema by the interrogation process. The SH list will adapt accordingly through a process of dynamic linkage substitution. The linkage that matches the values presented for the variable name is substituted into the SH list for that desktop.

In an adaptive list generation process in accordance with the present invention, a branch interrogation such as "Size?" in FIG. 7A, results in a substitution of a value, "Small" or a value, "Large" based upon a desktop variable name presented by the interrogation software. The variable value, Small or Large, is ascertained by interrogation of the desktop configuration just prior to SH list resolution. Thus, the resolved SH list reflects up-to-date desktop resource needs related to the variable "Size". Size, for example, could relate to the amount of memory capacity or disk space of the desktop.

Figure 8:
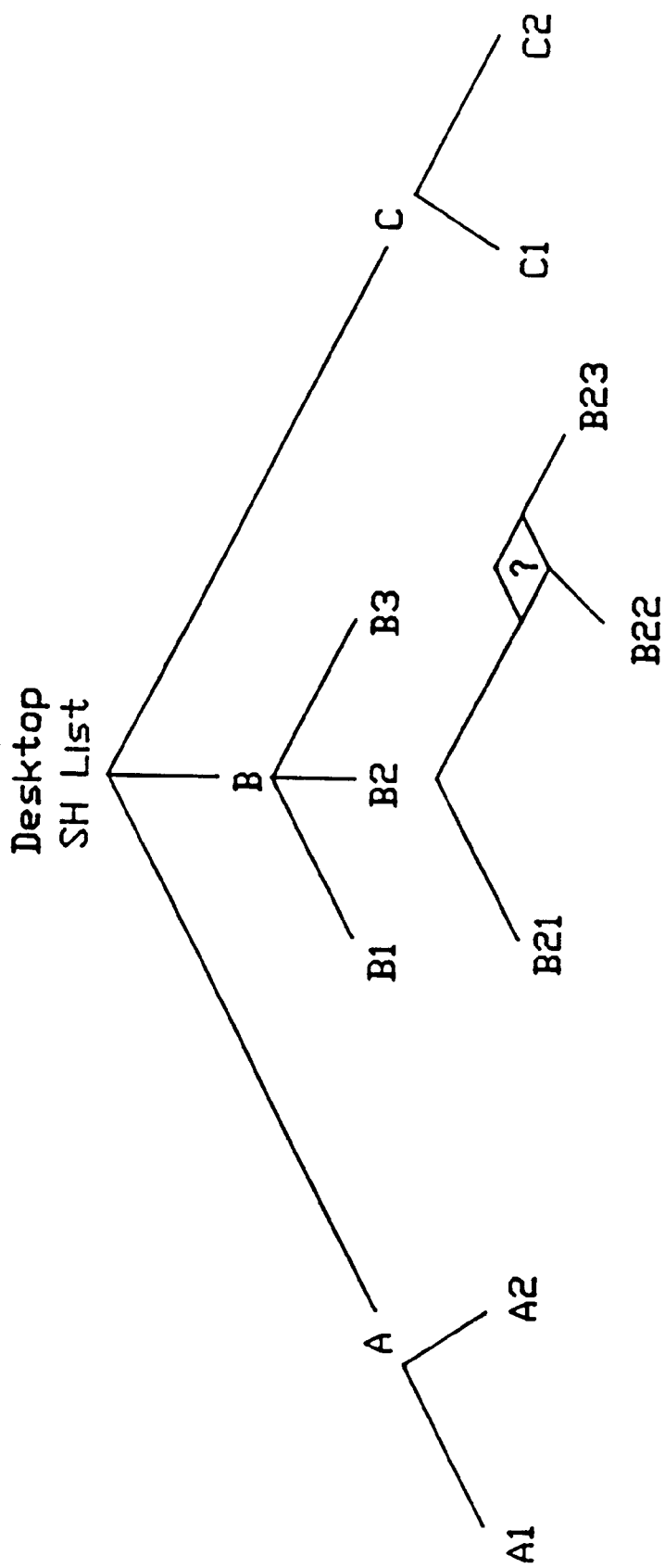
FIG. 8 shows an illustrative Schema which includes a dynamic linkage in accordance with the present invention.

Referring to the illustrative drawing of FIG. 8, there is shown another exemplary SH list Schema in accordance with the present invention. The overall Schema comprises sub-lists (or objects) A, B and C. Sub-list A includes sub-lists (or objects) A1 and A2. Sub-list B includes sub-lists (or objects) B1, B2 and B3. Sub-list C includes sub-lists (or objects) C1 and C2. Sub-list B2 includes sub-lists (or objects) B21, B22 and B23. The linkage between sub-list B2 and sub-lists B22 and B23 is a dynamic linkage. At the time when an SH list is resolved from the Schema, only one of the sub-lists B22 and B23 will be substituted into the SH list Schema. The detailed steps whereby a typical Schema is resolved to produce a SH list for a particular desktop are described below.

The use of dynamic linkage substitution to accommodate desktop platform changes will be better appreciated through the following illustrative example. One desktop resource variable could be the operating system variable named "Size" (more accurately, "ZOS" in one embodiment) which could be OS/2™ or Windows for example. A change in the desktop operating system variable can change a sub-list of resources that a desktop should have. During a desktop configuration process, the interrogation software sets values for desktop variable names such as operating system, microprocessor type, disk space, memory size, interrupts and installed application software. As explained above, the purpose of the interrogation process is to assign values for each such variable name. The operating system characteristic can be represented by the variable named "Size" in FIG. 7A, for example, and possible values for the Size variable could be "Small" for Windows and "Large" for OS/2.

Thus, a naming convention is used assign names for resource variables. The sub-lists (or objects) associated with a dynamic linkage correspond to different desktop configuration items. The value which is assigned to the variable by the interrogation software determines how the dynamic linkage will be resolved during SH list generation. The variable names used by the Schema can be arbitrary. However, the variable name assignment and values respectively correlate with linkage names and sub-lists (or objects) used to specify dynamic linkages in the SH list Schema. That way, the names can be used to resolve dynamic linkages during SH list resolution.

At the time of SH list resolution, the variable names and their values can be transported from the desktop to the computer location at which SH list resolution is to occur. The transport takes place over standard network connections using standard network transport protocols. The SH list resolution process ordinarily occurs at a central control computer. However, it could be performed at the desktop instead. SH List resolution is part of the configuration process which can be triggered by any number of events such as a desktop timer, the "boot procedures," or by the user selecting an appropriate icon. During SH list resolution, sub-lists (or objects) are linked into the SH list based on values for the variable names assigned during the interrogation process. This process occurs for each variable desktop resource. Thus, the desktop's SH list can adapt to desktop configuration changes.

Continuing with the above example in which "Small" is associated with a Windows operating system and "Large" is associated with an OS/2 operating system, Windows requires one set of resources which correspond to the items in the sub-list (or object) named "Small"; and OS/2 requires another set of resources which correspond to the items in the sub-list (or object) named "Large". The different sub-lists (or objects), for example, could set forth different applications which use different graphical interface modules for use with Windows on the one hand and with OS/2 on the other hand.

Since it is predictable that a desktop operating system may change from one type to another type, a dynamic linkage can be built into the SH list Schema to handle the operating system variable. In the example above, when the SH list is resolved from the Schema, a linkage will be generated in favor of a sub-list (or object) that reflects the current resource needs of the particular desktop under configuration.

SH list Schema resolutions for a multiplicity of desktops could be performed during off-peak hours. The result would be a multiplicity of SH lists. These SH lists then could be distributed to local servers for the differencing and comparison processes. During busy network times, the differencing process described below could be performed using local servers and the desktops. This approach reduces network traffic as well as central processing requirements during peak hours.

Moreover, resolved SH lists can apply to individual desktops or to entire workgroups. This is important because in the case of entire workgroup having the same resolved Should Have list, the resolution process would only have to be performed once, and each individual computer's Already Have list could be differenced against it. It also indicates the process is scalable, valid from the most discrete desktop configurations to largely generic groups of desktops.

An advantage of adaptive SH list generation using dynamic linkage substitution is that it can reduce the need for administrator intervention when the desktop environment is changed. The use of naming conventions in accordance with the present invention permits the resolution of an SH lists which reflect the particular needs of individual desktop environments without resort to rule based programming. The novel use of dynamic linkages, therefore, advantageously permits desktop users to customize their desktops to fit their particular requirements without imposing an undue management burden upon the network administrators. The use of dynamic linkages in connection with interrogation software that assigns values to the variables used to resolve such dynamic linkages, affords the automatic (administrator-less) connection of sub-lists (or objects) appropriate to individual desktops. These sub-lists (or objects) contain the information required to update the desktop during a configuration event.

Another advantage of SH list generation using dynamic linkage substitution is that the SH lists can automatically adapt to the policies and technology configurations of individual desktops. As explained below, the Schema can contain both dynamic linkages related to policy considerations and dynamic linkages related to technology considerations. During desktop configuration, a SH list is resolved from the Schema by determining which policy linkages and which technology linkages apply for the desktop in its current configuration and with its current user authorization level. The technology configuration of the desktop may change independently of the network administrator. However, since the SH list Schema can have dynamic linkages which can automatically adapt to such changes, a SH list nevertheless can automatically be generated even when a desktop environment changes. Moreover, administrators can alter the SH list resolution process based upon policy considerations by altering the dynamic linkages that relate to policy factors. Therefore, a SH list schema can produce a SH list which adapts to policy changes imposed by administration personnel and to desktop technology changes implemented by desktop users.

In summary, the user (or some other entity) may change the desktop configuration. The interrogation program assigns values representing the current state of variable desktop resources. Dynamic linkages in the Schema are resolved based upon the assigned values. Individual SH lists for desktops are generated as the linkages are resolved. The individual SH lists are used to determine what resources the desktop "needs".

Thus, the configuration process in accordance with the present invention permits the automation of system administration by separating policy decisions from technology packaging decisions. The use of variables and dynamic linkages in the technology packaging process permits technology packaging requirements to automatically conform to both policy changes and to desktop platform changes without the intervention of administrative personnel.

Date Change Detection

Referring to the illustrative drawings of FIG. 9, there is shown the use of a Last Updated Date/Time (LUDT) field and the Last Synchronized Date/Time (LSDT) field which can reduce the network transport, processing and file overhead associated with the comparison of SH list and Already Have (AH) list items. The LUDT for an item in an SH list represents the last date/time on which the item was updated or added to the SH list. An "item", for example, can be a file (program or data file) and/or parameter such as a transaction name or a data base definition. Client servers often manage directories of names whereby clients communicate. The names in these directories can be "items".

LUDTs relate to Schemas and resolved SH lists. LUDTs are updated as follows. Whenever a Schema is updated, the LUDT for the Schema record is updated. This represents a Schema configuration change. If later sub-lists (or objects) are added to the Schema, then the dates for those later sub-lists (or objects) are passed (percolated) up through the Schema, and a new latest LUDT is assigned through the Schema record. An LUDT can change in two ways: at the time the Schema is originally configured; and when a new latest LUDT percolates up through the Schema to the top of the Schema due to a change in a Schema sub-list (or object).

Thus, the LUDT can be used to identify changes in resources in the Schema.

LSDTs relate to individual desktops. The LSDT represents the last date/time on which the SH list (or object) for a desktop and the AH list (or object) for that desktop were synchronized. The present invention can avoid a one-to-one comparison of all SH list items to all AH list items when there have been no changes to previously configured resources. By comparing the most recent LUDT for all of the entries in a generated SH list with the LSDT for a desktop AH list, a determination can be made as to whether or not a comparison of the items SH and AH lists is necessary. If all of the LUDTs in the SH list are earlier than the LSDT for the desktop AH list, then no previously defined resources in the SH list have changed since the last synchronization of the SH and AH lists for the desktop, and no lists need to be compared for changes. That is, if the desktop AH list and its SH list were last synchronized after the last time Schema resources were last updated, then no further comparison is required.

Fractional Date Change Detection

Figure 10:
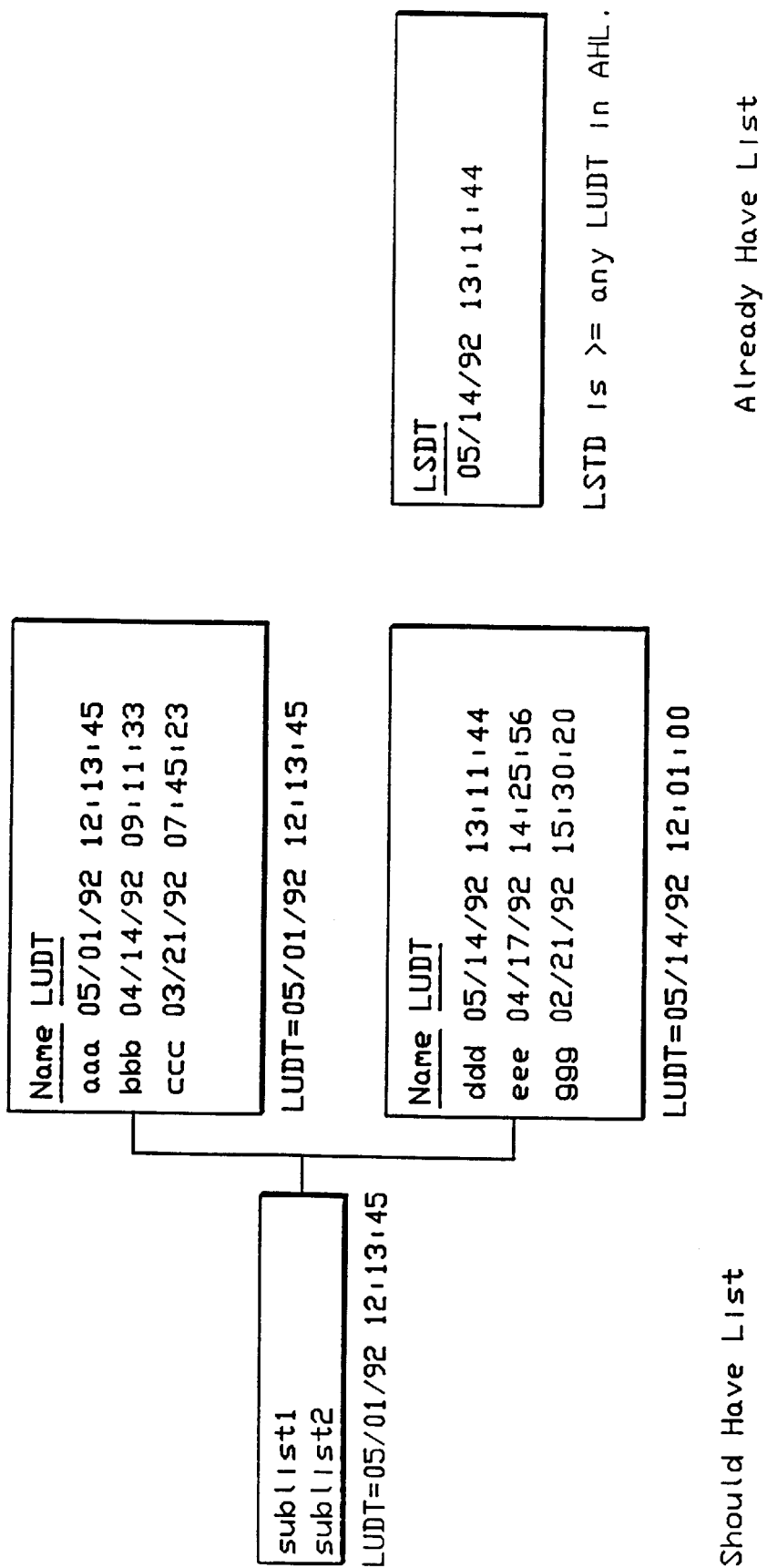
FIG. 10 illustrates the use of the LUDT/LSDT process in accordance with the present invention.

Referring to the illustrative drawing of FIG. 10, another use of dates to isolate changes involves maintaining an overall LUDT for the entire SH list. This approach requires maintenance of overall LUDTs for each sub-list within the SH list. The reasoning is that, if the overall LUDTs for each of the SH list sub-lists for a particular desktop are earlier than the desktop LSDT then the contents of the generated SH list resource list could not have been altered by addition, deletion or update since the last synchronization of the SH and AH lists for the desktop. This approach shall be referred to as Enhanced LUDT. (ELUDT) The use of the ELUDT avoids flat lists. The ELUDT requires that the LUDT information percolate up through the Schema. An LUDT of a "Service" is as late as the update time/date of its most recently updated resource. This LUDT would be its ELUDT.

The LUDT or ELUDT processes can be used during the SH list/AH list comparison in order to bypass the one-to-one comparison of all AH list items with all SH list or sub-list items when no additions, deletions or updates have been introduced to the SH list or sub-list (or objects) since the date/time of the last synchronization. In essence, the LUDT or ELUDT process involves zooming in on the LUDT or ELUDT information to determine whether or not changes have occurred. Comparison of date/time information in the resolved SH list and the AH list for a given desktop facilitates a differencing process which can isolate which resources require updating without the need to go through an item-by-item comparison of Should Have list items and AH list items.

It will be appreciated that LUDT is useful for "flat" lists, while ELUDT is useful for structured lists. The LUDT can identify changed resources. The ELUDT is useful at the sub-list level to identify the addition or deletion of entire sub-lists of resources. There can be multiple levels of sub-lists and multiple levels of ELUDTs.

The drawing of FIG. 10 shows the use of the LUDT process in connection with an SH list. The LSDT for the desktop AH list is compared with the overall SH list LUDT and with the LUDTs for each of the two SH sub-lists to determine whether any one-to-one sub-list comparison is necessary. In this case, since the LSDT is later than each of the three LUDTs associated with the SH list, no further comparison is necessary.

The ELUDT process works not only for sub-lists, but also for equivalent intermediate connecting structures such as objects. For example, if objects are maintained instead of lists then current ELUDT information is maintained for the objects. Keeping track of ELUDTs for a master list and for all sub-lists is tantamount to inheritance of ELUDT information within object classes.

The ELUDT information is checked as part of the differencing process to determine whether or not an item-by-item comparison of the actual process of comparing the actual contents of SH and AH lists is necessary. Actual comparisons are required only when SH list or sub-list have been changed since the last synchronization of the desktop AH and SH lists. Moreover, as explained below, a comparison process in accordance with the present invention seeks to directly compare as few items as is necessary to bring the AH list up to date with the SH list. This limits network transport and reduces processing and file overhead.

Schema Change Detection

The system and method of the present invention advantageously permit the detection of changes across dynamic linkages in a Schema. This is significant. The process involves the dynamic generation of an SH list from a Schema when a desktop is to be configured. In order to avoid the network overhead inherent in an item-by-item comparison of components on the desktop with components listed in the SH list, it is desirable to have a mechanism to determine whether or not there have been changes in the SH list or in the AH list which would require further detailed comparison. If no such changes have occurred, then no detailed comparison is required. Network transport is thereby reduced.

The process of Schema change detection involves first determining whether or not there have been structural changes to the SH list by comparing a checksum value for the SH list with a corresponding checksum value of the desktop AH list. Mismatching checksums indicate structural changes to the SH list. Thus, if the checksum values do not match, then the SH and AH lists are compared to determine the affect of the structural change. If the checksum values do match then reference is made to the LUDT/LSDT information to determine what components have been updated within the same structure.

The LUDT/LSDT process alone is not sufficient to identify changes where a dynamic linkage is involved. This is because a dynamic linkage change may result in a different, yet "older" LUDT. Specifically, a sub-list substituted in due to a different dynamic linkage substitution may in fact have an earlier date than the previously substituted sub-list. The result is a new and earlier LUDT. However, using the LUDT/LSDT process alone, no change in the SH sub-list would be identified because the LUDT is still earlier than the LSDT. Thus, the date comparisons alone are unreliable in identifying changes to the SH list brought on by different dynamic linkage resolutions.

Therefore, a potential problem with the LUDT/LSDT process is that the desktop environment may have changed after the last synchronization of the AH and SH lists for a desktop. Specifically, the LUDT of each resolved SH list and each resolved SH sub-list used in the most recent synchronization might be older than the LSDT, but the desktop platform nevertheless may have changed since the most recent synchronization. That is, after the last synchronization a desktop variable may have changed. The result can be a different dynamic linkage resolution from that of the previous synchronization. This change in variable, such as a change in monitor types for example, will not ordinarily be detectable through the LUDT/LSDT process alone because as described above, a dynamic linkage change, can bring in a set of different but technically "older" items, or can drop (remove) the "latest" items in a sublist causing the LUDT to revert to an "older" level. Nevertheless, the change in desktop variables may change the resources that a desktop should have. Thus, it is important to detect such changes.

A lookaside table of substitution values used during the last SH list generation process can be stored so as to identify required SH list changes due to changes in the SH Schema caused by desktop variables.

Another process in accordance with the invention for identifying changes in the resources that a desktop should have uses a checksum process to detect Schema changes. These Schema changes can be Static (administrator implemented) changes; or they can be the result of changes in dynamic linkages.

A unique numerical identifier for each list (or object), which shall be called an object identifier (OID), is assigned to each resource and to each sub-list (or object and to any other connecting elements or sub-sub-lists) used to generate the SH list. The OID is like the fingerprint for a resource.

During the generation of an SH list, the OID of each resource or sub-list included in the SH list is processed using routine checksum methods such as CRC or Sum/Product. An overall OID checksum (OIDC) for the SH list is calculated. If the overall OIDC is equal to a Last Synchronized Checksum (LSC) for the user desktop (which is simply the OIDC from the last configuration process), then the overall structure of the generated SH list has not changed. This is regardless of the use of, or the number of dynamic linkages. The LUDT process is used to determine whether or not there have been changes in the contents of any particular list or sub-list where the structure, such as the dynamic linkage, (identified by the OIDC) has not changed.

The OID process detects structural Schema changes. The LUDT process detects changes in the contents of individual resource lists or sub-lists. The OID checksum process, together with the LUDT process allows the one-to-one AH list to SH list comparison to be bypassed in cases where there have been no changes, even where dynamic linkage substitution or other dynamic or generation techniques have been employed.

Referring to the illustrative drawing of FIG. 11, there is shown in an example of simple Schema change detection (no date change detection) using an OID checksum to detect dynamic linkage substitution. The overall OIDC of the SH list is compared with the LSC of the desktop AH list. If the overall OIDC is not equal to the LSC, which represents the overall OIDC from the last configuration, then there has been a change in the composition of the sublists. In that case, the overall most recently generated OIDC becomes the new LSC, and further comparison is required to detect the detailed changes.

Fractional Schema/Date Change Detection

Figure 12:
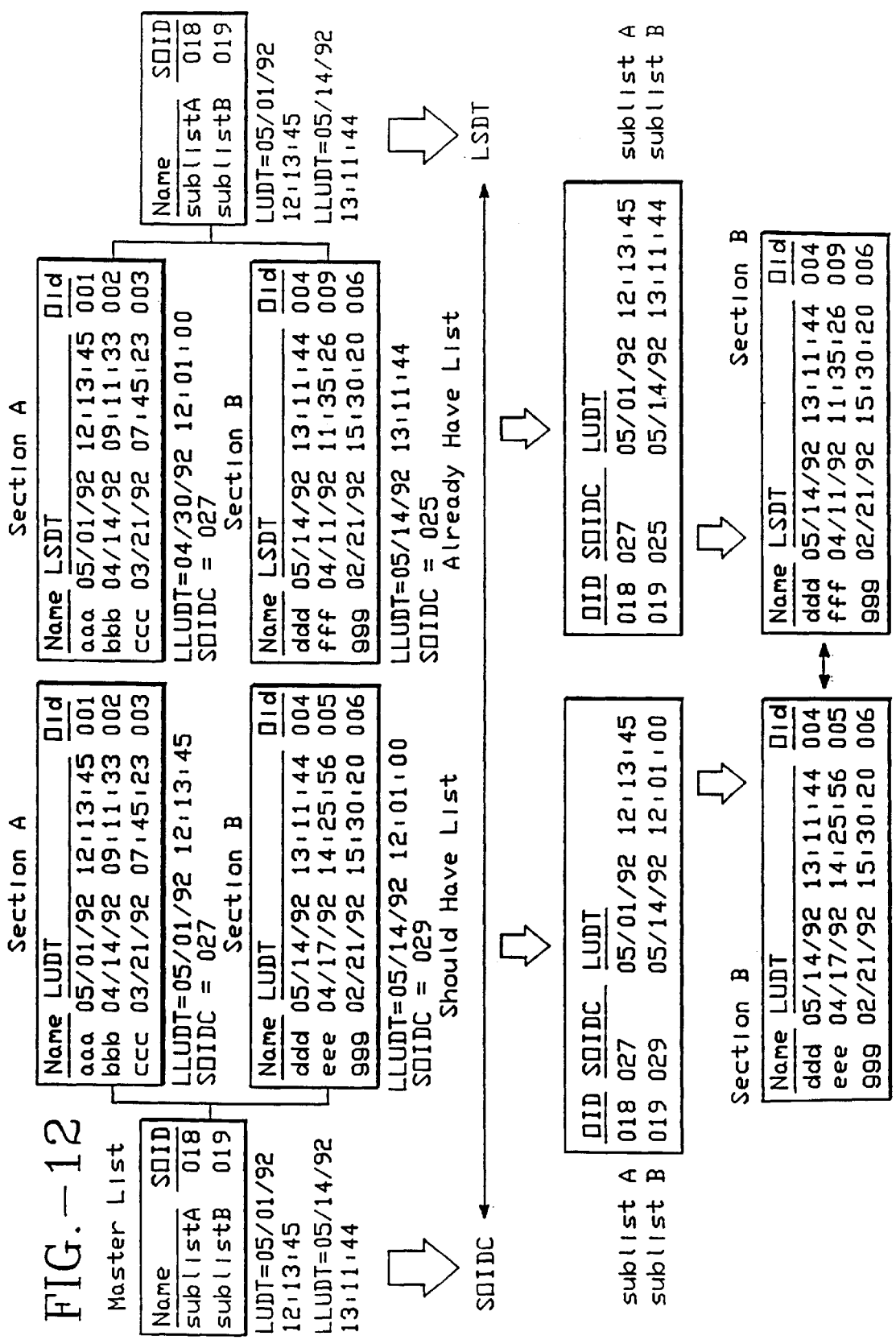
FIG. 12 illustrates the process of fractional change detection by parsing a SH list Schema using both an LUDT/LSDT process and an OIDC/LSC process in accordance with the present invention.

FIG. 12 shows an example of fractional Schema/Date change detection in accordance with the invention. The process detects both changes in linkages and changes within resource sublists. Referring to FIG. 8, for example, a checksum process can be used to determine whether the linkage substitution of B22 or B23 is different from the linkage substitution the last time the AH and SH lists were synchronized. Referring again to FIG. 12, for example, the LUDT process is used to determine whether an existing resource entry within any of the sub-lists has changed. For example, a sub-list may have resource "ggg". The parameters within resource "ggg" may have changed, however. This change in resource "ggg" parameters is identified by date changes. Only sub-lists and resources for which changes have occurred require comparison as explained in relation to FIG. 12.

Referring to FIG. 12, there is shown a fractional date change detection process. A latest LUDT (LLUDT) is generated for the overall SH list while the SH list is being generated, and an LLUDT is maintained for the AH list. Similarly, for each sub-list, a separate LLUDT is maintained. In order to avoid further comparison, the LLUDT for a given sub-list will have to be earlier than the LSDT. The fractional change detection process involves separate change detections and comparisons for the different sub-lists. The LLUDT for sub-list A indicates the latest LUDT out of all of the resource entries in sub-list A. The LLUDT for sub-list B, indicates the latest LUDT out of all of the entries in sub-list B. Similarly, for the AH list, an LLUDT is maintained for sub-list A, and an LLUDT is maintained for sub-list B. Thus, LUDT and LLUDT values are maintained both for the SH list and for the AH list.

A Sublist OIDC (SOIDC) is generated while the SH list is generated. A desktop LSC is saved for the AH list each time the AH list and the SH list are synchronized during the configuration process. The LLUDT/SOIDC information for the SH list is compared with the LSDT/LSC for the overall AH list. If the LLUDT matches the LSDT, and the SOIDC matches the LSC, then no further comparison of linkages or resource entries in the AH and SH lists is necessary. If, they are not equal, however, then the change detection/ differencing process proceeds further.

In particular, the comparison of the SOIDC and the LSC for sub-lists A of the SH list and the AH list shows that for these sub-lists, the SOIDCs and LSC's match. Thus, there has been no change in the linkages or the resource information in sub-list A for the SH list or in sub-list A for the AH list. For sub-list B, however, the SOIDCs are different. This indicates a linkage change in the Schema. Moreover, the LUDTs are different as well. This indicates an update in a resource entry in sub-list B.

Thus, the contents of sub-list B of the SH list no longer match the contents of sub-list B of the AH list. Further comparison of the AH sub-list B and the SH sub-list B are required. This further comparison can involve network transport of the SH sub-list to the desktop for comparison with a desktop AH sub-list. In particular, referring to the specific contents of sub-list B of the SH list, the file identified as "eee" having the OID 005 is different from the file identified as "ff" which has an OID of 009.

It will be appreciated that the above description is an example of fractional change detection because comparisons are performed on fractional parts of the Schema rather than on the entire Schema. No changes between the SH sub-list A and the AH sub-list A were detected. Hence, no further comparison of the SH sub-list A and the AH sub-list A were undertaken. However, changes between the SH sub-list B and the AH sub-list B were detected. Hence, further comparison of the AH sub-list A and the SH sub-list B were performed.

In the present embodiment of the invention, the value names produced by the interrogation software are transported from the desktop to a central computer (which can be a local control point or a centralized control point). The SH list resolution is performed by the control point computer. The LUDT and OIDC information from the resolved SH list is transported to the desktop where the differencing process takes place. (The differencing process can also take place at the control point computer that performed the SH list resolution or at some other designated control point computer.) If differences exist then the sub-lists represented by the OIDC's that do not match are transported from the control point to the desktop for an item-by-item comparison. The process repeats again with the OIDC's for the next level sub-lists, and so forth through subsequent sub-lists (the process is infinitely recursive), following sublists and items that only have different OIDCs or LUDT changes. Finally, the entire list of differences is articulated and then individual resources are transported over the network to the desktop.

Operational Example

Figure 13A:
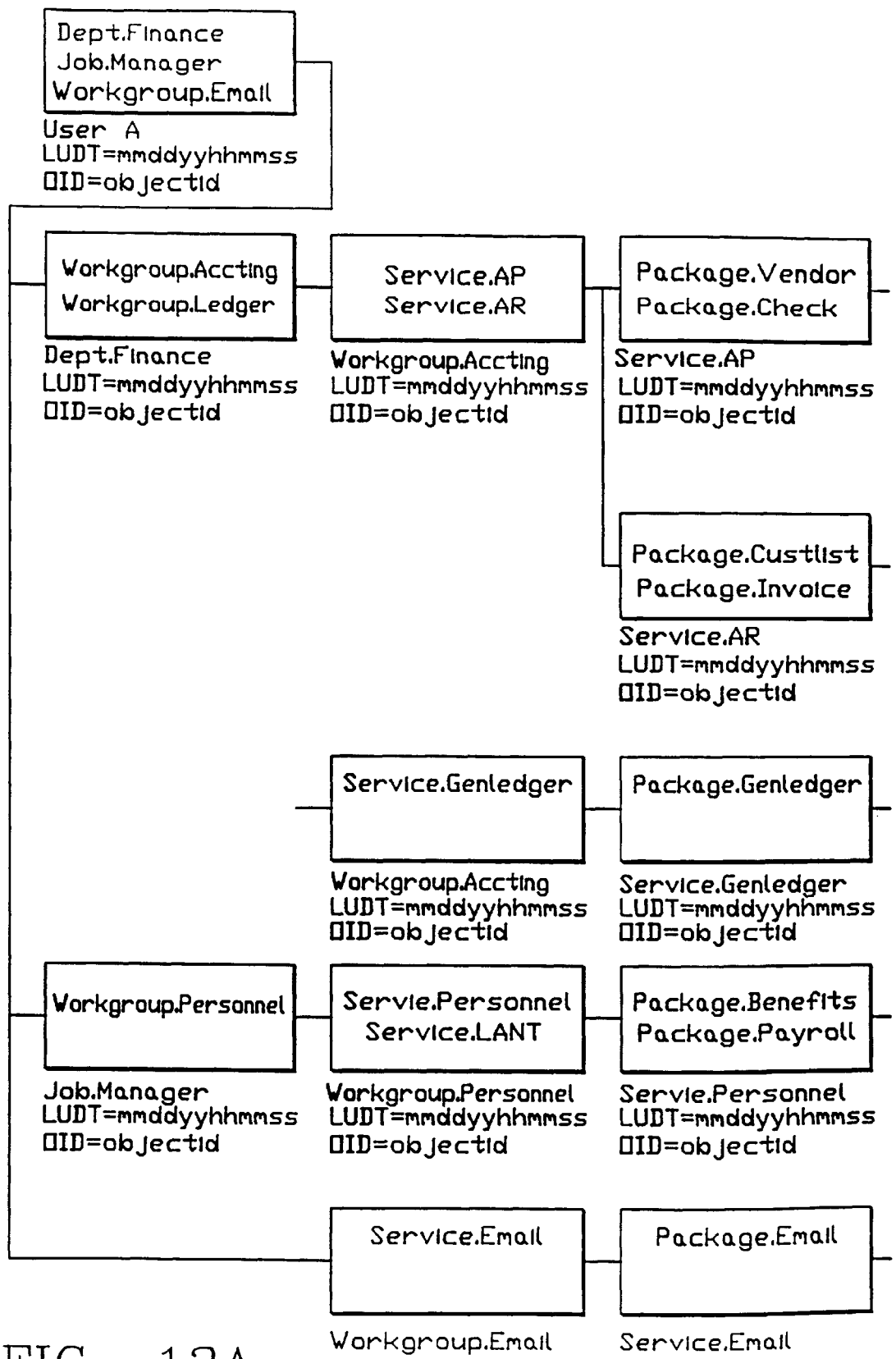

Referring to the illustrative drawings of FIGS. 13A–B, there is shown an exemplary SH list Schema. The left side of the Schema is represented by FIG. 13A. The right side of the Schema is represented by FIG. 13B. The Schema embodies both policy based information and technology/physical information. The left side of the Schema represents increasingly abstract considerations such as policy, security and access. The right side of the Schema represents technology oriented or physical desktop environment factors such as the exact resource constituents of a desktop. However, this right/left dichotomy is merely illustrative. There is no restriction on the location/type/intermingling of dynamic linkages in a schema.

Referring to FIG. 13B, there is shown a series of dynamic linkages 32 interconnecting resources and individual files. These dynamic linkages represent predictable changes in a desktop environment. In the example of FIG. 13B, the variable is operating system type ("ZOS"). The possible alternatives are OS/2 and Windows. If a particular desktop contains OS/2 then the dynamic linkages for OS/2 resources is selected during the SH list resolution process for that particular desktop. Alternatively, if a particular desktop contains the Windows operating system then the dynamic linkages for the Windows resources are selected during the SH list resolution process for the desktop.

In practice, a Schema configuration such as that in FIGS. 13A–B serves as a template which can be modified to meet the technology requirements for a particular desktop and the policy constraints of an organization. Specifically, the illustrative Schema contains relationships that are typical in organizations. For example, there are Departments and Workgroups. There are Services and Packages. There are Resources and Files.

Each column (or tier) can be independently administered, allowing for distributed administration. That is, for example, the column with boxes labelled "Workgroup" can be managed independently of the column with boxes labelled "Service". Also, for example, the column with boxes labelled "Service" can be managed independently of the column with boxes labelled "Resources". In general, for example, the columns nearer the left side of the Schema represented by FIG. 13A could be managed by administrative personnel. Whereas, the columns nearer the right side of the Schema could be managed by technology oriented personnel. Thus, administrative oriented management issues can be separated from technology oriented management issues.

The Schema can be maintained at a central control computer. Alternatively, it can have different branches located "nearer" to the actual desktops that use the services connected on these branches. Generally, policy decisions are administered more centrally. However, more localized technical issues may be administered locally. Consequently, branches pertaining to these localized technical issues may be maintained at more remote control points. In order to distribute branches of the Schema, an intelligent segmentation of the Schema must be accomplished so that local (LAN) processes can control localized branches. Schema distribution across a distributed network is an implementation issue which will be understood by those skilled in the art and will not be described further herein.

Referring to the illustrative drawings of FIGS. 14A–B there is shown another representative Schema in which a policy based decision point has been added. That decision point relates to user's Department. The decision point is introduced through another dynamic linkage 34.

Figure 15A:
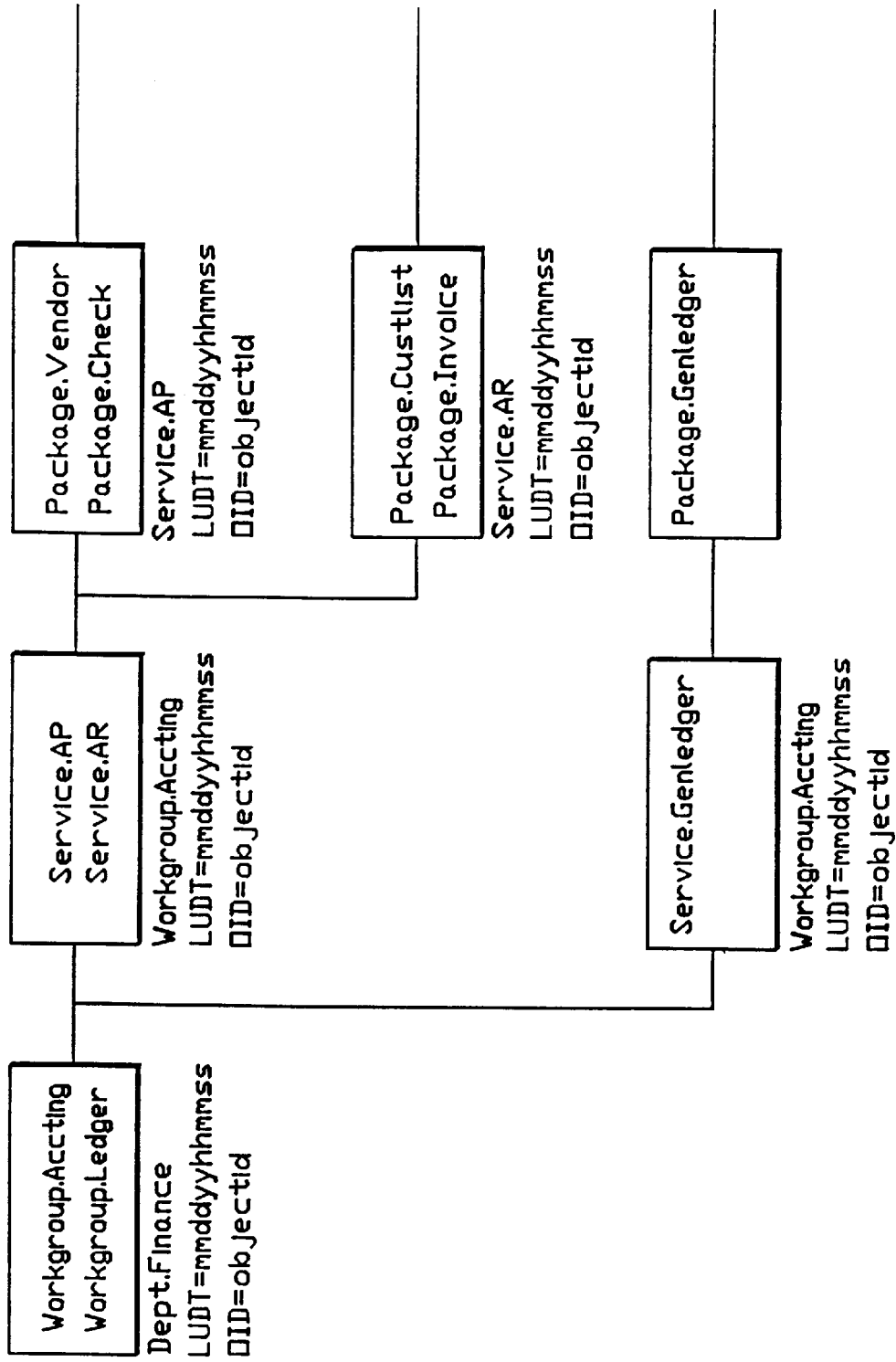
FIGS. 15A–B illustrate the Schema of FIGS. 14A–B in which the policy based dynamic linkage and the technology based dynamic linkages have been resolved.
Figure 15B:
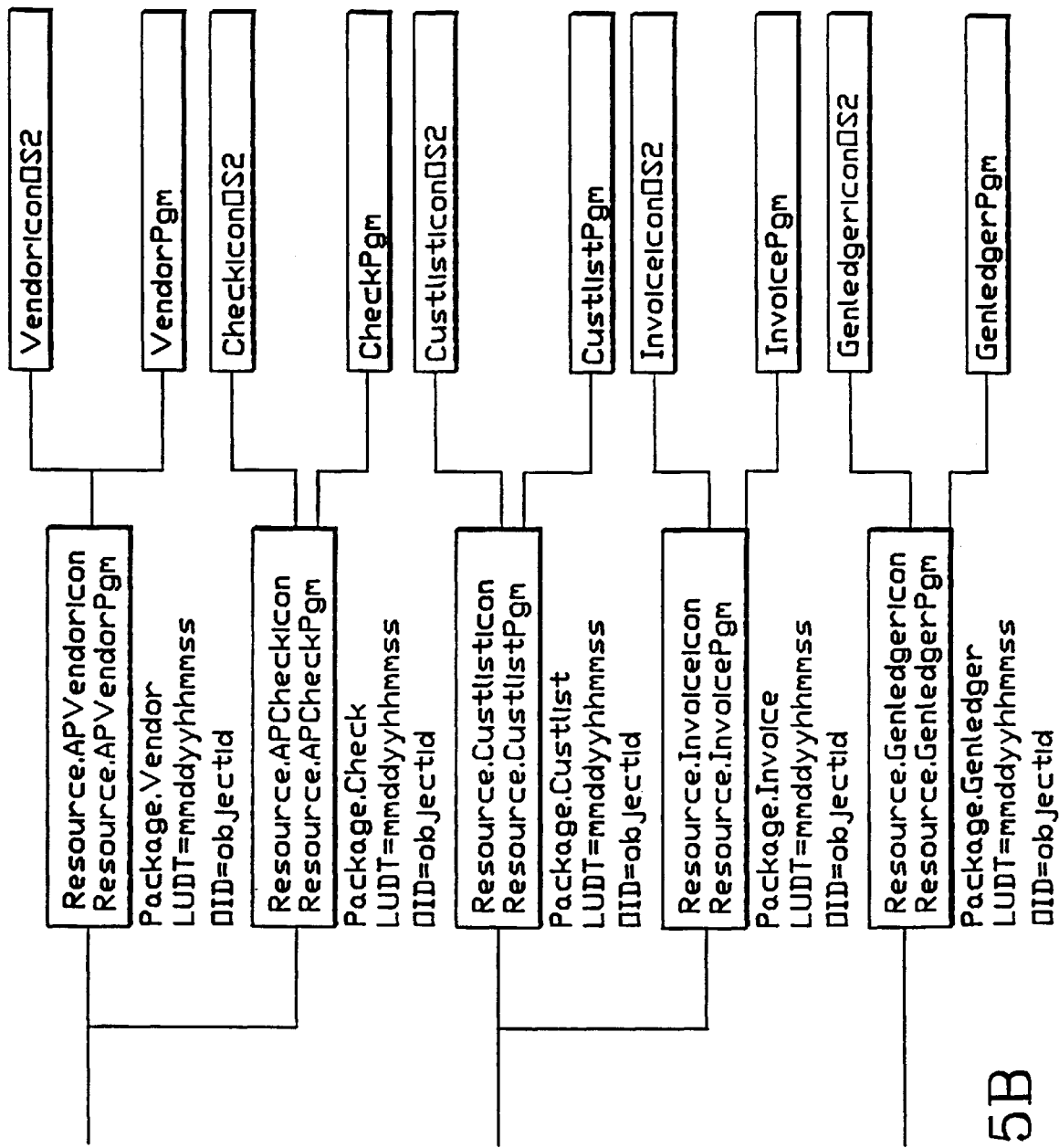
Figure 16:
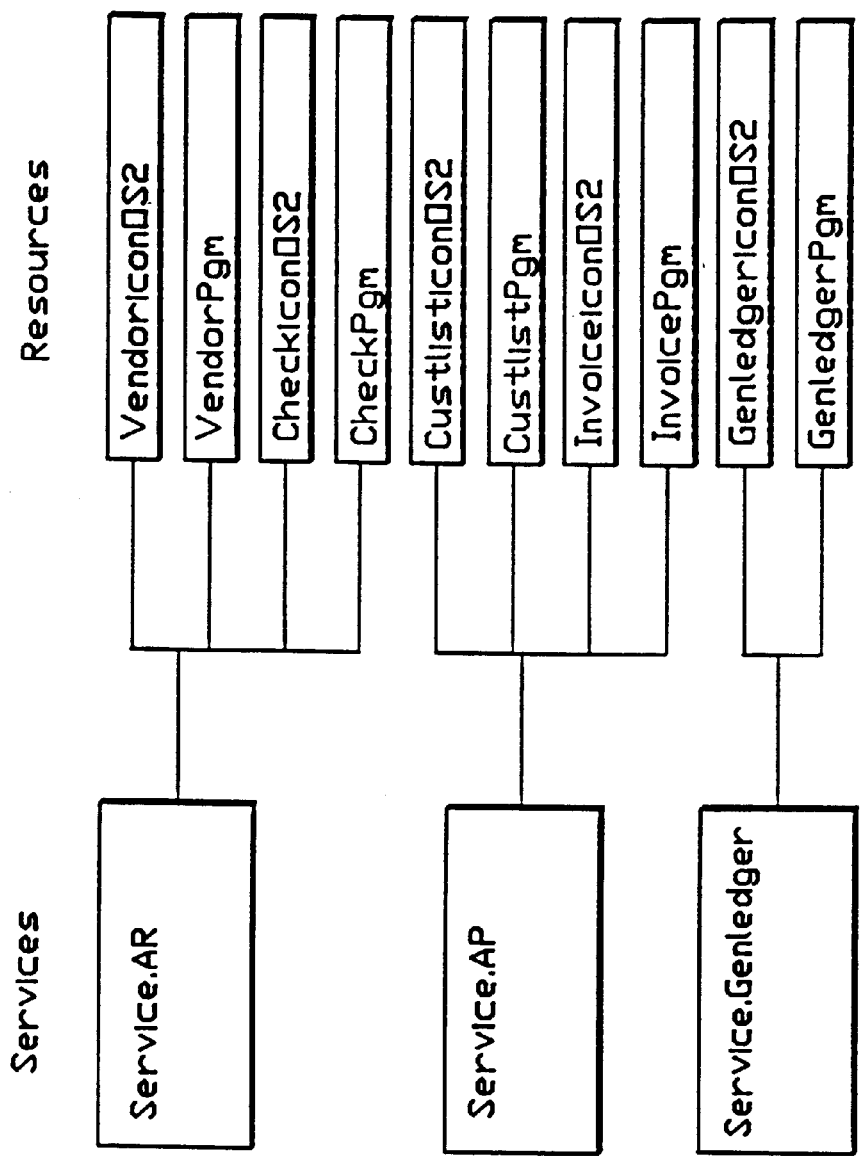
FIG. 16 illustrates an exemplary Should Have (SH) list which has been resolved from the Schema of FIGS. 14A–B.

FIGS. 15A–B and FIG. 16 demonstrate, in conceptual terms, the resolution of a SH list from the Schema of FIGS. 14A–B. In FIGS. 15A–B, the dynamic linkages have been resolved. The Department is "Finance". The operating system is OS/2. In FIG. 16 the Schema is compacted to only two "test node levels" or "differencing levels".

Checksums are computed only at prescribed differencing or test node levels. Thus, for example, referring to FIGS. 15A–B, differences are not computed at the Workgroup, Packaging or Resource levels. Hence, no Checksums are computed for these levels. Differences are, however, computed for the Service level, and a Checksum is computed for each Service. The number and locations in the Schema of differencing levels is an administrator controlled implementation issue.

Figure 17:
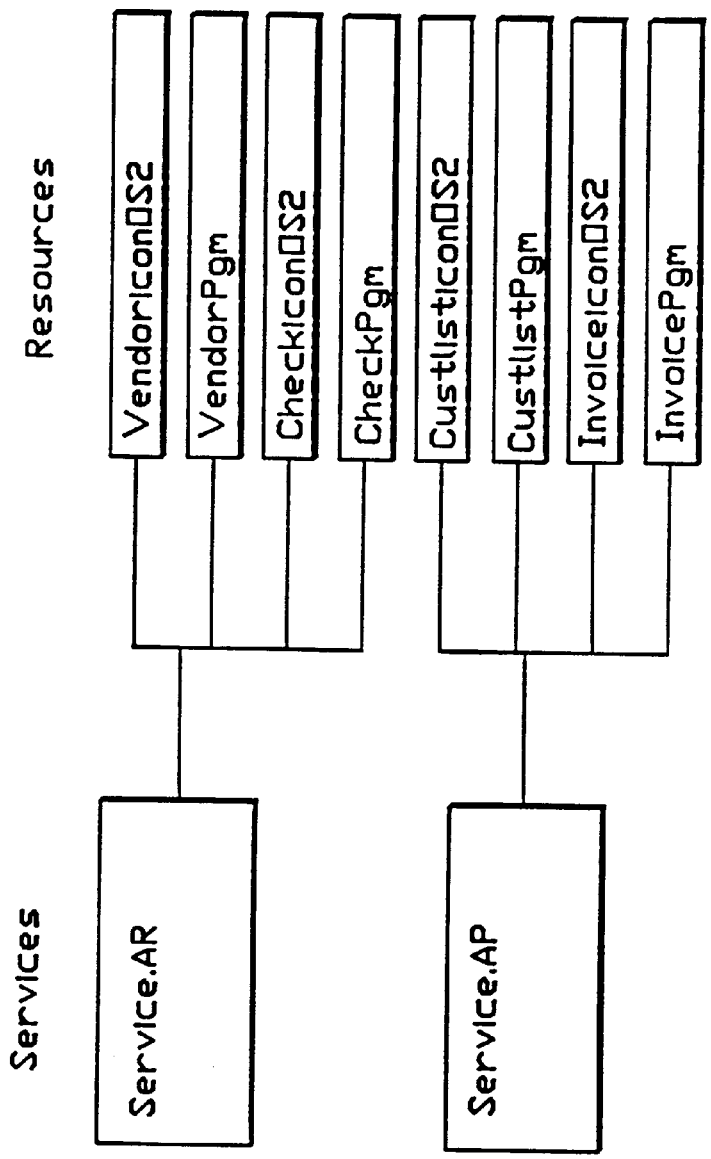
FIG. 17 shows an illustrative Already Have (AH) list for an exemplary desktop.

Referring to the illustrative drawing of FIG. 17, there is shown an AH list of Services and File Resources that were on a particular desktop at the previous configuration. The AH list represents the configuration as synchronized at the last configuration activity. The actual Files may have been altered independently of the configuration process, e.g., a user deletes a file. The AH list can optionally be verified for correctness prior to the AH/SH differencing by comparing the actual current contents of the desktop to the previous AH list and altering the LUDTs or OIDCs that relate to items in the AH list that differ from the actual current desktop contents. The differencing process will detect these alterations and reconfigure the desktop accordingly.

Figure 18:
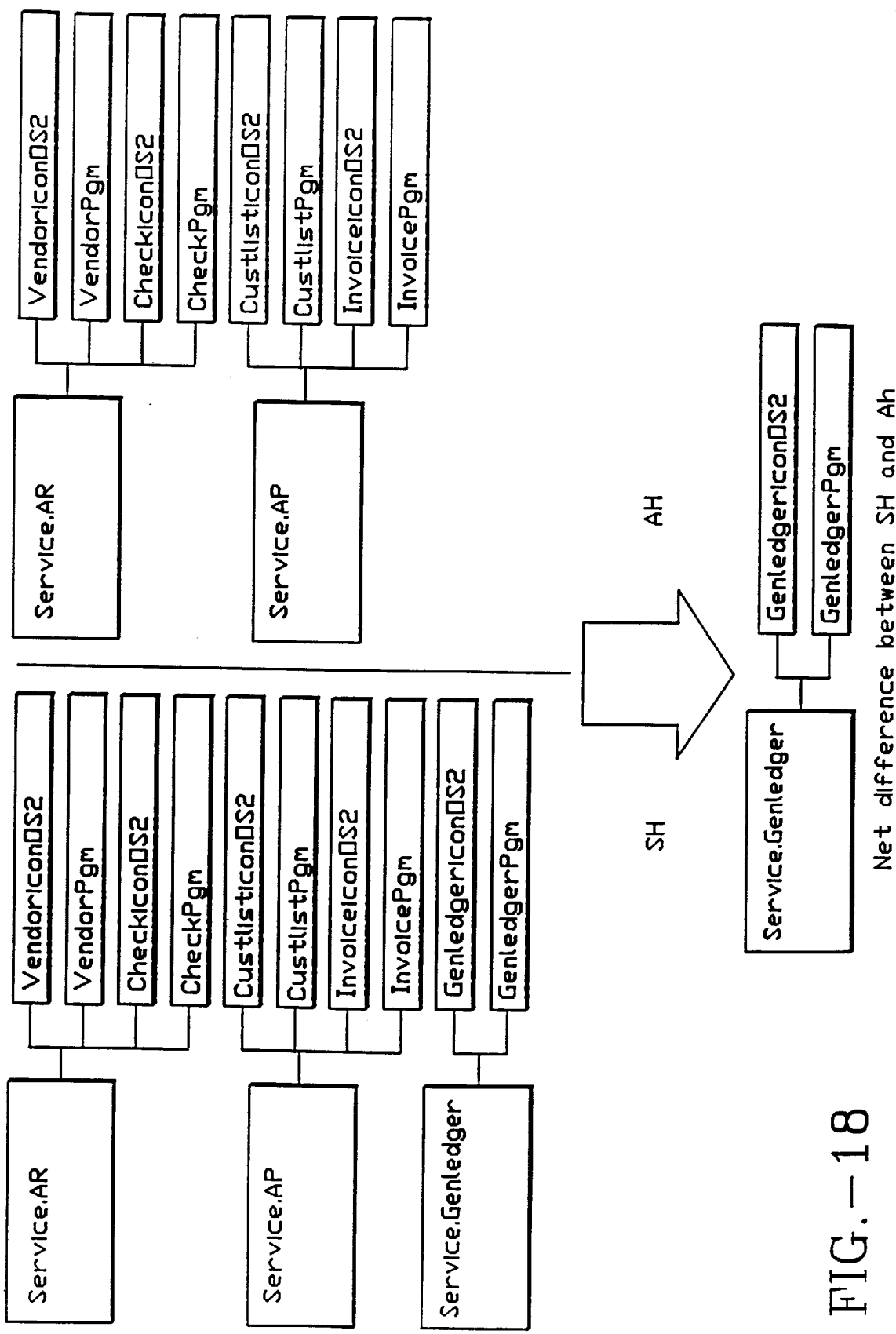
FIG. 18 illustrates a differencing process involving the SH list of FIG. 16 and the AH list of FIG. 17.

FIG. 18 shows the differencing process as between the resolved SH list of FIG. 16 and the AH list of FIG. 17. The differencing process proceeds in a fashion similar to that described with reference to FIG. 12. The SH list contains Service.Genledger. However, there is no Service.Genledger for the AH list. Thus, a difference will be identified between the SH and AH lists. The next step is to reconfigure the desktop to add Service.Genledger using ordinary network transport techniques.

SH List Resolution Routine

The illustrative flow diagram of FIG. 22 illustrates a SH List Resolution Routine in accordance with a present embodiment of the invention. In Read Record Step 64, a record is read from the Schema file. The Schema can be stored as a standard data structure. For example, it can be stored as objects, in a database, or it can be stored as a "flat" file containing data. FIGS. 13A–B and 14A–B illustrate a Schemas which include collections of records with pointers between records. In the Schema of FIGS. 13A–B and 14A–B, each record comprises a group of fields. Each field can be either a variable or a pointer to another record. Note that object messaging and inheritance, rather than pointers, may be used in an object oriented implementation.

For example, referring to FIG. 14A, the record identified as Service.AP Service.AR contains three fields. Two fields contain pointers that point toward the bottom of the Schema. One of these downward pointing pointers points at the record identified as Package.Vendor Package.Check. Another of these two downward pointing pointers points to the record identified as Package.CustList Package.Invoice. The third upward pointing pointer in the record Service.AP Service.AR points back upward in the Schema toward the record identified as Workgroup.Accting Workgroup.Ledger.

In Parent Percolation Step 66, the OID of this newly read record is percolated up to the "parent" of the record. For example, referring once again to the record Service.AP Service.AR record, its OID is passed up to its parent record, Workgroup.Accting Workgroup.Ledger.

As explained below, the SH list resolution routine is recursive. As a result, the OIDs of all records throughout the Schema are percolated upward from the bottom (right side) of the Schema to the top (left side) of the Schema. The benefit of such percolation of OIDs is that at each differencing level or decision point level, a Checksum can be computed which reflects the constituent records downstream from such differencing or decision point level.

In Decision Step 68, a determination is made as to whether or not the most recently read record represents a new differencing level or decision point level. Each record carries with it an indication of whether or not it is to be used as a differencing or decision point level. This indication is an administrator controlled option. Thus, there can be inserted more or fewer differencing levels depending upon administrative requirements.

If the record sits at a new differencing level, then in Allocation Step 70 a new OID Checksum (CRC) buffer is opened to collect OIDs of "children" of this record. For example, the Service.AP Service.AR in FIG. 14A is designated as a new differencing level. Hence, OIDs for the records connected downstream from the record identified as Service.AP Service.AR will be passed (percolated) up through the Schema to the buffer opened for the record identified as Service.AP Service.AR.

In the Process Records Fields Routine 72, each field in the record is processed in order to follow the pointers associated with such fields down (to the right) through the Schema. The Process Records Fields Routine 72 is a recursive routine explained in connection with FIG. 23. In Decision Step 74, a determination is made as to whether the record which has just been processed was at a new level. If it was, then in Checksum Computation Step 76, a Checksum (CRC) value is computed from the downstream OIDs collected from downstream records. The result is the SOIDC for this new differencing level.

In SOID Percolation Step 78, the newly computed SOIDC is passed (percolated) up to the "parent" of the record at this new level. In Decision Step 80, a determination is made as to whether or not the LUDT for the record is later than the LUDT of the parent of the record. For example, referring to FIG. 14A, the Service.AP Service.AR is the "child" of record identified as "Workgroup.Accting Workgroup.Ledger; conversely, Workgroup.Accting Workgroup.Ledger is the parent of the record Service.AP Service. AR. If the LUDT of the record at this new level is later than that of its parent, then in LUDT Percolation Step 82, the LUDT of the child record at the new level is passed (Percolated) up to become the LUDT of the parent record.

Process Record Field Review

Figure 23:
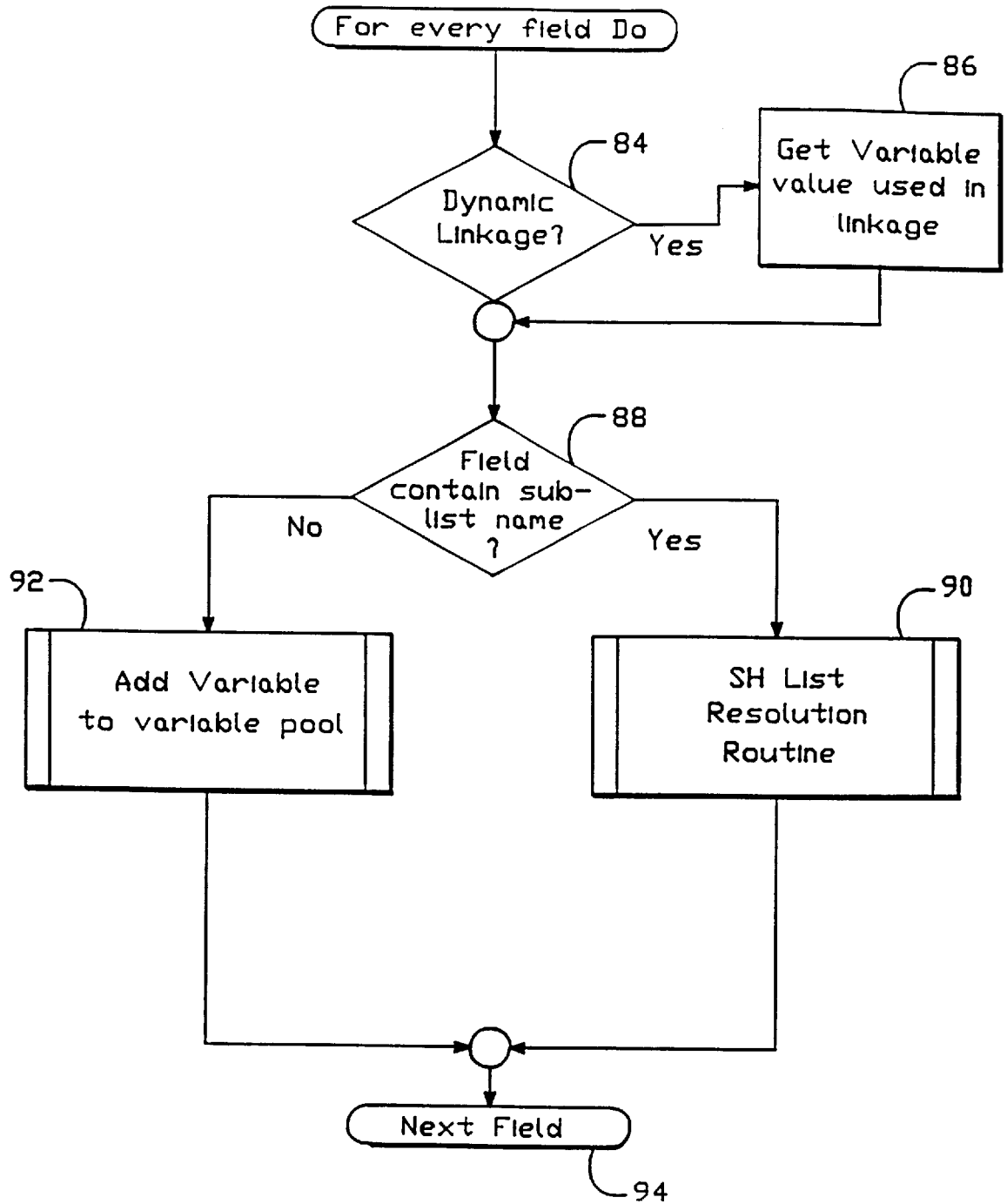
FIG. 23 is an illustrative flow diagram of a Process Record Field Routine in accordance with the present invention.

Referring to the illustrative drawing of FIG. 23, there is shown a flow diagram of a Process Record Field Routine of a current embodiment. This routine is identified as box 72 in the SH List Resolution Routine of FIG. 22. For each field in a record, Decision Step 84 determines whether or not the field has a connection with a dynamic linkage. If the field does have a connection with a dynamic linkage, then in Linkage Resolution Step 86, the variable value gleaned by the interrogation software is obtained in order to resolve the linkage. In Decision Step 88, a determination is made as to whether or not the field contains a sub-list name. It will be appreciated, that a sub-list name in essence, can be a pointer to a downstream record. Thus, the field may contain a pointer to a downstream record in the form of a sub-list name. Alternatively, in an object oriented environment, the connection to the downstream record may involve object messaging. If Decision Step 88 determines that the downstream field contains a sub-list name (or otherwise identifies a downstream record), then the SH List Resolution Routine, explained with reference to FIG. 22, is called and executed for that downstream record identified by the sub-list name (or pointer or object messaging) in the field under consideration.

It is important to note that the process described with reference to FIGS. 22 and 23 is highly recursive. Referring back to FIG. 22, the Process Record Fields Routine step 72 occurs midway through the SH list resolution routine. Then, in the course of the execution of the Process Record Fields Routine, as shown in FIG. 23, the SH List Resolution Routine step 90 may be called and executed to process the field under consideration. The result of this recursiveness and the nesting of Process Records Fields Routines within SH List Resolution Routines and vice versa is that for each record and for each field of that record the Schema branches are followed downwardly (left to right) until the bottommost branches of the Schema tree are reached. During this process, OID and LUDT information is percolated back upward through the Schema tree. Checksums at differencing levels are computed based on this percolated information.

Returning to Decision Step 88, if the determination is made that the field does not contain a sub-list name (or pointer or involve object messaging) then in Add Variable Step 92, the variable identified by the field is added to a variable pool for the field. In step 94 the Routine of FIG. 23 is executed again for the next field of the same record.

As mentioned above, the process of FIGS. 22 and 23 is highly recursive. As the SH list resolution routine is executed, Checksums are computed; OIDs and SOIDs are percolated upward from child records to parent records; and LUDTs are percolated upward from child records to parent records. When the complete SH list resolution routine is finished, the result is a master level OIDC and SOIDCs at each of the differencing levels. In addition, there is a master level LUDT as well as LLUDTs at each of the differencing levels. Thus, the Schema resolution results in SH lists like those in FIGS. 12 and 21 which are replete with Checksum, OID and Date information at various differencing levels.

Sublist Differencing Routine

Referring to the illustrative flow drawing of FIG. 24, there is shown a flow diagram for a Sub-list Differencing Routine in accordance with a present embodiment of the invention. This routine starts at the top of the SH list and AH list and proceeds downward through the respective lists. For example, referring to FIG. 12, the routine starts at the Master List level and proceeds downwards to the Sub-list A/B level. Referring to FIG. 18, the routine starts at the Service level and proceeds to the Resource File level.

In Decision Step 94, a determination is made as to whether the AH OIDC matches the SH OIDC for a particular differencing level. If it does not, then in Transport step 96, the SOIDs for the next level to be considered are transported from the desktop to the location where the differencing process takes place. If the differencing process takes place at a local desktop then, of course, no such Transport step is necessary. In Comparison step 98, the Sub-list OIDs are compared to identify differences. Also, in step Comparison Step 98, differences between the LUDTs and the LSDTs are identified.

In Differences List Building step 100, a list of the differences between the sub-lists is constructed. Also in step 100, the date differences are included. In Decision Step 102, a determination is made as to whether the LUDT of the level in question matches the LSDT. If not, then in Date Difference List Building Step 104, a list of the items in the SH list later than the AH LSDT is assembled.

In Decision Step 106 a determination is made as to whether the items in the lists constructed pursuant to steps 100 and 104 are sub-list items or discrete items. If they are sub-list items, then the Sub-list Differencing Routine is executed (recursively) for each of these items as indicated by Sub-list Differencing Routine step 108. For each difference in the lists built pursuant to boxes 100 and 104, that is a discrete item, the Discrete Change Processing Routine illustrated in FIG. 25 is executed. Of course, if in Decision Step 94 it is determined that OIDCs match and in Decision step 102 it is determined that dates match, then the Sub-list Differencing Routine is finished without resort to the other steps.

Discrete Change Processing Routine

Referring to the illustrative drawing of FIG. 25, there is shown a flow diagram for a Discrete Change Processing Routine in accordance with a current implementation of the invention. For every item placed in a difference list pursuant to steps 100 and 104 in FIG. 24, decision step 112 determines the type of difference. If the difference involves an item update then in step 114 the item is updated on the desktop. If the type of difference is an item deletion then in step 116 the appropriate item is deleted from the desktop. If the type of difference is an item addition, then a new item is transported to the desktop. As indicated in (optional) step 112, the added component may have to be installed via a Script program.

Various modifications to the preferred embodiment can be made without departing from the spirit and scope of the invention.

Thus, the foregoing description is not intended to limit the invention which is described in the appended claims in which:

1. A method of managing resources in a network of computers comprising:

provining in a first computer in the computer network a plurality of already have (AH) resources that the first computer already has (AH resources);

providing in the first computer an AH information structure;

wherein the AH information structure includes one or more respective first already have (AH) information units that respectively identify one or more different respective ones of the plurality of AH resources and that respectively provide respective AH information unit identifiers;

wherein the AH information structure further includes at least one respective second AH information unit that respectively identifies one or more different respective ones of the first AH information units and that provides a respective AH differencing value calculated from respective AH information unit identifiers provided by the one or more respective first AH information units identified by such at least one respective second AH information unit;

providing in the computer network a plurality of should have (SH) resources that computers in the network might need (SH resources);

providing in a second computer an SH information structure;

wherein the SH information structure includes one or more respective first should have (SH) resource information units that respectively identify one or more different respective ones of the plurality of SH resources and that respectively provide respective SH information unit identifiers;

wherein the SH information structure further includes at least one second SH information unit that respectively identifies one or more different respective ones of the first SH information units and that provides a respective SH differencing value calculated from respective SH information unit identifiers provided by the one or more respective first SH information units identified by such at least one second SH information unit; and comparing one or more respective AH differencing values with one or more respective corresponding SH differencing values to determine whether one or more of the SH resources are needed to update the resources of the first computer.

2. The method of claim 1, wherein the one or more respective first AH information units include respective first records that respectively include one or more respective pointers that respectively identify one or more different respective ones of the plurality of AH resources and that respectively store respective AH information unit identifiers;

wherein the at least one respective second AH information unit includes a respective first record that includes one or more respective pointers that respectively identify one or more different respective ones of the first AH information units and that respectively stores a respective AH differencing value;

wherein the one or more respective first SH information units include respective first records that respectively include one or more respective pointers that respectively identify one or more different respective ones of the plurality of SH resources and that respectively store respective SH information unit identifiers; and wherein the at least one respective second SH information unit includes a respective first record that includes one or more respective pointers that respectively identify one or more different respective ones of the first SH information units and that respectively stores a respective SH differencing value.

3. The method of claim 1, wherein the one or more respective first AH information units include respective first objects that respectively include one or more respective references that respectively identify one or more different respective ones of the plurality of AH resources and that respectively include respective references to AH information unit identifiers;

wherein the at least one respective second AH information unit includes a respective first object that includes one or more respective references that respectively identify one or more different respective ones of the first AH information units and that respectively include a respective reference to a AH differencing value;

wherein the one or more respective first SH information units include respective first objects that respectively include one or more respective references that respectively identify one or more different respective ones of the plurality of SH resources and that respectively include respective references to SH information unit identifiers;

wherein the at least one respective second SH information unit includes a respective first object that includes one or more respective references that respectively identify one or more different respective ones of the first SH information units and that respectively include a respective reference to a SH differencing value.

4. The method of claim 1, wherein the respective AH differencing value includes a checksum value calculated from the AH information unit identifiers provided by the one or more respective first AH information units identified by such at least one respective second AH information unit; and wherein the respective SH differencing value includes a checksum value calculated from the SH information unit identifiers provided by the one or more respective first SH information units identified by such at least one respective second SH information unit.

5. The method of claim 1, wherein each respective AH information unit identifier includes a numerical object identifier (OID);

wherein each respective SH information unit identifier includes a numerical object identifier (OID);

wherein the respective AH differencing value includes a checksum value calculated from the AH information unit identifiers provided by the one or more respective first AH information units identified by such at least one respective second AH information unit; and wherein the respective SH differencing value includes a checksum value calculated from the SH information unit identifiers provided by the one or more respective first SH information units identified by such at least one respective second SH information unit.

* * * * *